(12) United States Patent  (10) Patent No.: US 7,438,269 B2
Pfister et al.  (45) Date of Patent: Oct. 21, 2008

(54) ADJUSTABLE TILT MOUNT

(75) Inventors: Joel W. Pfister, Shorewood, MN (US); James G. Wohlford, Minneapolis, MN (US); Dominic D. Grey, Blaine, MN (US)

(73) Assignee: CSAV, Inc., Savage, MN (US)

( * ) Notice: Subject to any disclaimer, the term of this patent is extended or adjusted under 35 U.S.C. 154(b) by 0 days.

(21) Appl. No.: 11/647,756

(22) Filed: Dec. 29, 2006

(65) Prior Publication Data

US 2007/0194196 A1    Aug. 23, 2007

Related U.S. Application Data

(63) Continuation of application No. 11/194,298, filed on Aug. 1, 2005, now Pat. No. 7,178,775, which is a continuation of application No. 10/455,624, filed on Jun. 6, 2003, now Pat. No. 7,152,836.

(60) Provisional application No. 60/438,889, filed on Jan. 9, 2003.

(51) Int. Cl.
    *E04G 3/00* (2006.01)
(52) U.S. Cl. .............. 248/292.14; 248/299.1; 248/920; 248/923
(58) Field of Classification Search ............ 248/292.14, 248/299.1, 289.11, 298.1, 919–923, 274.1; 361/681–683; 345/654, 659; 403/59, 62, 403/65, 87, 101, 113, 116, 117
See application file for complete search history.

(56) References Cited

U.S. PATENT DOCUMENTS

| 257,050 | A | 4/1882 | Munson |
| 1,282,489 | A | 10/1918 | Strodel |
| 1,320,775 | A | 11/1919 | Mather |
| 1,574,227 | A | 2/1926 | Andersen |
| 1,628,218 | A | 5/1927 | Beauchamp |
| 1,646,379 | A | 10/1927 | Whitehead |
| 1,977,153 | A | 10/1934 | Spence, Jr. |
| 2,233,882 | A | 3/1941 | Bobek |
| 2,466,219 | A | 4/1949 | Farrell et al. |

(Continued)

FOREIGN PATENT DOCUMENTS

EP    1590595    8/2004

(Continued)

OTHER PUBLICATIONS

U.S. Design Application as Filed Jan. 3, 2005, 13 Pages.

(Continued)

*Primary Examiner*—Korie Chan
(74) *Attorney, Agent, or Firm*—Patterson, Thuente, Skaar & Christensen

(57) ABSTRACT

A mounting system for an interface such as a flat panel display such as a computer monitor or television allows the display to be pivoted about a virtual pivot axis which passes through a center of gravity of the display. The system includes a support which is connected directly or indirectly to a support surface and a mount which is connected to a back side of the display. The support and the mount are slidable with respect to one another through an arc which has the virtual pivot axis as its center.

19 Claims, 37 Drawing Sheets

U.S. PATENT DOCUMENTS

| | | |
|---|---|---|
| 2,734,708 A | 2/1956 | Cohn |
| 3,182,946 A | 5/1965 | Dudko |
| D212,618 S | 11/1968 | Kreps |
| 3,574,340 A | 4/1971 | Busche |
| 4,483,503 A | 11/1984 | Gahan |
| 4,549,710 A | 10/1985 | Prince et al. |
| 4,645,153 A | 2/1987 | Granzow et al. |
| 4,708,312 A | 11/1987 | Rohr |
| 4,718,317 A | 1/1988 | Hensler |
| 4,768,744 A | 9/1988 | Leeds et al. |
| 4,814,759 A | 3/1989 | Gombrich et al. |
| 4,836,478 A | 6/1989 | Sweere |
| 4,836,486 A | 6/1989 | Vossoughi et al. |
| 4,844,387 A | 7/1989 | Sorgi et al. |
| 4,934,645 A | 6/1990 | Breslow |
| 4,989,813 A | 2/1991 | Kim et al. |
| 5,040,759 A | 8/1991 | Wainwright |
| 5,139,223 A | 8/1992 | Sedighzadeh |
| 5,165,644 A | 11/1992 | Allen |
| 5,195,900 A | 3/1993 | Kumagai et al. |
| 5,277,392 A | 1/1994 | Rossman et al. |
| 5,322,255 A | 6/1994 | Garrett |
| 5,398,901 A | 3/1995 | Brodmann et al. |
| 5,404,182 A | 4/1995 | Nomura |
| D361,062 S | 8/1995 | Lino |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,603,478 A | 2/1997 | Wang |
| 5,634,622 A | 6/1997 | Pye |
| 5,687,939 A | 11/1997 | Moscovitch |
| 5,713,549 A | 2/1998 | Shieh |
| 5,732,922 A | 3/1998 | Jeon |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,797,568 A | 8/1998 | Gongora et al. |
| 5,842,672 A | 12/1998 | Sweere et al. |
| 5,854,735 A | 12/1998 | Cheng |
| 5,918,841 A | 7/1999 | Sweere et al. |
| 5,918,845 A | 7/1999 | Whitaker |
| 5,923,528 A | 7/1999 | Lee |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,809 A | 11/1999 | Sweere et al. |
| 6,000,560 A | 12/1999 | Barkan |
| 6,012,693 A | 1/2000 | Voeller et al. |
| 6,015,120 A | 1/2000 | Sweere et al. |
| 6,019,332 A | 2/2000 | Sweere et al. |
| 6,042,068 A | 3/2000 | Tcherny |
| 6,045,103 A | 4/2000 | Costa et al. |
| 6,048,013 A | 4/2000 | Moilanen et al. |
| 6,068,227 A | 5/2000 | Morgan et al. |
| 6,102,348 A | 8/2000 | O'Neill |
| 6,113,047 A | 9/2000 | Wung et al. |
| 6,119,997 A | 9/2000 | Lieshout |
| 6,126,128 A | 10/2000 | Costa et al. |
| 6,138,970 A | 10/2000 | Sohrt et al. |
| RE36,978 E | 12/2000 | Moscovitch |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,273,382 B1 | 8/2001 | Pemberton |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,171 B1 | 4/2002 | Suzuki et al. |
| 6,378,830 B1 | 4/2002 | Lu |
| 6,394,403 B1 | 5/2002 | Hung |
| 6,402,109 B1 | 6/2002 | Dittmer |
| 6,409,134 B1 | 6/2002 | Oddsen, Jr. |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,454,234 B1 | 9/2002 | Westbrook |
| 6,478,274 B1 | 11/2002 | Oddsen, Jr. |
| 6,478,275 B1 * | 11/2002 | Huang ............... 248/284.1 |
| 6,484,987 B2 | 11/2002 | Weaver |
| 6,494,429 B2 | 12/2002 | Tajima |
| 6,517,040 B1 | 2/2003 | Wen |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,606 S | 7/2003 | Theis et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,654,235 B2 | 11/2003 | Insand |
| 6,663,064 B1 | 12/2003 | Minelli et al. |
| 6,671,928 B2 | 1/2004 | Huang |
| 6,672,553 B1 | 1/2004 | Lin |
| 6,752,363 B2 | 6/2004 | Boele |
| D493,800 S | 8/2004 | Pfister et al. |
| D494,978 S | 8/2004 | Pfister |
| 6,905,101 B1 | 6/2005 | Dittmer |
| 6,923,413 B2 | 8/2005 | Dozier |
| 6,966,532 B2 | 11/2005 | Ishizaki et al. |
| 7,152,836 B2 | 12/2006 | Pfister et al. |
| 7,178,775 B2 | 2/2007 | Pfister et al. |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084369 A1 | 7/2002 | Weaver |
| 2002/0179801 A1 | 12/2002 | Kim |
| 2002/0190180 A1 | 12/2002 | Cotterill |
| 2003/0042385 A1 | 3/2003 | Chien-Ju Hung et al. |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011930 A1 | 1/2004 | Tuohy, III et al. |
| 2004/0011932 A1 | 1/2004 | Duff |
| 2004/0011938 A1 | 1/2004 | Oddsen, Jr. |
| 2004/0211870 A1 | 10/2004 | Bremmon et al. |
| 2004/0232298 A1 | 11/2004 | Bremmon |
| 2004/0232301 A1 | 11/2004 | Bremmon |
| 2004/0245420 A1 | 12/2004 | Pfister et al. |
| 2005/0051688 A1 | 3/2005 | Dittmer |
| 2005/0133678 A1 | 6/2005 | Dittmer |
| 2005/0263659 A1 | 12/2005 | Pfister et al. |
| 2007/0090250 A1 | 4/2007 | O'Keene |
| 2007/0176067 A1 | 8/2007 | Monaco |

2007/0235614 A1 10/2007 O'Keene et al.

FOREIGN PATENT DOCUMENTS

| GB | 994246 | 8/1980 |
|---|---|---|
| JP | 2-95279 | 7/1990 |
| JP | 2001-034180 | 2/2001 |
| JP | 2001-309276 | 11/2001 |
| KR | 1989-0001804 | 4/1989 |
| KR | 1990-0002291 | 3/1990 |
| KR | 1992-0002567 | 4/1992 |
| KR | 0176089 | 4/2000 |
| KR | 2002-0071289 | 9/2002 |
| KR | 2002-0092700 | 12/2002 |
| KR | 10020020071289 A | 12/2002 |
| KR | 1020030012977 A | 2/2003 |
| WO | WO 00/73697 A1 | 12/2000 |
| WO | WO 2004/070257 A1 | 8/2004 |

OTHER PUBLICATIONS

Brochure Entitled "*The Perfect Mounting Systems*", no date provided, 2 Pages.
CAD Drawings printout for Rhinomounts dated Jul. 22, 2005, 9, pages.
Peerless Technical Data Sheet, dated Mar. 21, 2000, 1 Page.
Peerless Installation and Assembly, dated Dec. 6, 2001, 2 Pages.
Peerless Installation and Assembly, Plasma Adapter bracket for Zenith H40DVODP dated Jun. 22, 2001, 1 Page.
Peerless Technical Data Sheet, dated Oct. 8, 2002, 2 Pages.
Peerless Technical Data Sheet—Universal single stud tilting wall mount, dated May 19, 2003, 6 Pages.
Peerless Installation and Assembly—Solid•Point Flat Wall Mount for Zenith Plasma Model DPDP60W, dated Feb. 21, 2005, 1 Page.
Peerless Installation and Assembly—Plasma Adapter Bracket for Sony PFM-50C1 Plasma Monitor, pp. 2, dated Sep. 26, 2002.
Peerless Installation and Assembly—Plasma Adapter Bracket for 61" NEC PlasmaSync 61MP1 & 61MX2 Plasma Screens, dated Nov. 10, 2003, 3 Pages.
Peerless Installation and Assembly—Plasma Adapter Bracket for 61" NEC PlasmaSync 61MP1 & 61MX2 Plasma Screens, dated Nov. 10, 2003, 2 Pages.
Peerless Installation and Assembly—Secure Wall Mount for Philips, Aug. 12, 1998, 4 Pages.
Brochure Entitled: Panel Display Pivot Mount for Model PDM 625, 2 pgs. Admitted prior art, no date available.
Brochure Entitled: Panel Display Pivot Mount for Model Nos. PDM 110 and PDM 120, 2 pgs. Admitted prior art, no date available.
Plasma TV Wall Mount Installation Manual entitled: *Wall Mount Kit for Plasma TV Screens*, Rev. 1.0, dated Nov. 2003, pp. 1-12.
Brochure Entitled: Peerless® Flat Panel SmartMount™ Universal Tilt Wall Mount for 32" to 50" Plasma and LCD Flat Panel Screens, 2 pgs. . © 2006.
Brochure Entitled: Peerless® Flat Panel SmartMount™ Universal Tilt Wall Mount for 61" to 102" Plasma and LCD Flat Panel Screens, 2 pgs. . © 2006.
Brochure Entitled: Peerless® Flat Panel SmartMount™ Universal Tilt Wall Mount for 42" to 71" Plasma and LCD Flat Panel Screens, 2 pgs. . © 2006.
Brochure Entitled: Peerless® Flat Panel SmartMount™ Universal Tilt Wall Mount for 32" to 60" Plasma and LCD Flat Panel Screens, 2 pgs. . © 2006.
Brochure Entitled: Peerless® Flat Panel SmartMount™ Universal Tilt Wall Mount for 23" to 46" LCD Flat Panel Screens, 2 pgs. . © 2006.
Brochure Entitled: Peerless® Flat Panel SmartMount™ Universal Flat Wall Mount for 61" to 102" Plasma and LCD Flat Panel Screens, 2 pgs. . © 2006.
Brochure Entitled: Peerless® Flat Panel SmartMount™ Universal Flat Wall Mount for 42" to 71" Plasma and LCD Flat Panel Screens, 2 pgs. . © 2006.
Brochure Entitled: Peerless® Flat Panel SmartMount™ Universal Flat Wall Mount for 32" to 60" Plasma and LCD Flat Panel Screens, 2 pgs. . © 2006.
Brochure Entitled: Peerless® Flat Panel SmartMount™ Universal Flat Wall Mount for 23" to 46" LCD Flat Panel Screens, 2 pgs. . © 2006.
Brochure Entitled: Peerless® Flat Panel SmartMount™ Universal Flat Wall Mount for 61" to 102" Plasma and LCD Flat Panel Screens, 2 pgs. © 2006.
Brochure Entitled: Peerless® Solid Solutions—Solid Support™ Installation and Assembly: SmartMount™ Universal Tilt Wall Mount for 22"—49" Screens, pp. 8, issued Mar. 31, 2005.
ViewSonic Mount, pp. 1. circa 2005.
Hitachi Mount, pp. 1. circa 2005.
Reply to Counterclaims in Defendant's Answer, Affirmative Defenses, and Counterclaims to the Amended Complaint for Patent Infringement, Court File No. 05-2242 (JR/JJG), filed Nov. 21, 2006, 6 Pages.
Defendant's Answer, Affirmative Defenses, and Counterclaims to the Amended Complaint for Patent Infringement, Court File No. 05-2242 (JR/JJG), filed Nov. 1, 2006, 15 Pages.
Exhibit 1, part 1, to Defendant's Answer, Affirmative Defenses, and Counterclaims to the Amended Complaint for Patent Infringement, Court File No. 05-2242 (JR/JJG), filed Nov. 1, 2006, 50 pages.
Exhibit 1, part 2, to Defendant's Answer, Affirmative Defenses, and Counterclaims to the Amended Complaint for Patent Infringement, Court File No. 05-2242 (JR/JJG), filed Nov. 1, 2006, 50 pages.
Exhibit 1, part 3, to Defendant's Answer, Affirmative Defenses, and Counterclaims to the Amended Complaint for Patent Infringement, Court File No. 05-2242 (JR/JJG), filed Nov. 1, 2006, 50 Pages.
Exhibit 1, part 4, to Defendant's Answer, Affirmative Defenses, and Counterclaims to the Amended Complaint for Patent Infringement, Court File No. 05-2242 (JR/JJG), filed Nov. 1, 2006, 50 Pages.
Exhibit 1, part 5, to Defendant's Answer, Affirmative Defenses, and Counterclaims to the Amended Complaint for Patent Infringement, Court File No. 05-2242 (JR/JJG), filed Nov. 1, 2006, 50 Pages.
Exhibit 1, part 6, to Defendant's Answer, Affirmative Defenses, and Counterclaims to the Amended Complaint for Patent Infringement, Court File No. 05-2242 (JR/JJG), filed Nov. 1, 2006, 19 Pages.
Defendant's Non-Infringement Claim Charts and Invalidity Charts as filed in Civil Action No. 05 2242, dated Jul. 27, 2006.
*Peerless' Memorandum in Support of its Motion to Supplement its Prior Art Statement*, Court Document No. 179, Filed Apr. 17, 2008, Case No. 0:05-cv-02242-JRT-JJG, 11 Pages.
*Declaration of* Vlad Gleyzer *and attached Exhibit 1*, Court Document No. 180, Filed Apr. 17, 2008, Case No. 0:05-cv-02242-JRT-JJG, 4 Pages.
*Declaration of* Jennifer L. Gregor *and attached Exhibits C, D, 1 and 2*, Court Document No. 181, Filed Apr. 17, 2008, Case No. 0:05-cv-02242-JRT-JJG, 34 Pages.

\* cited by examiner

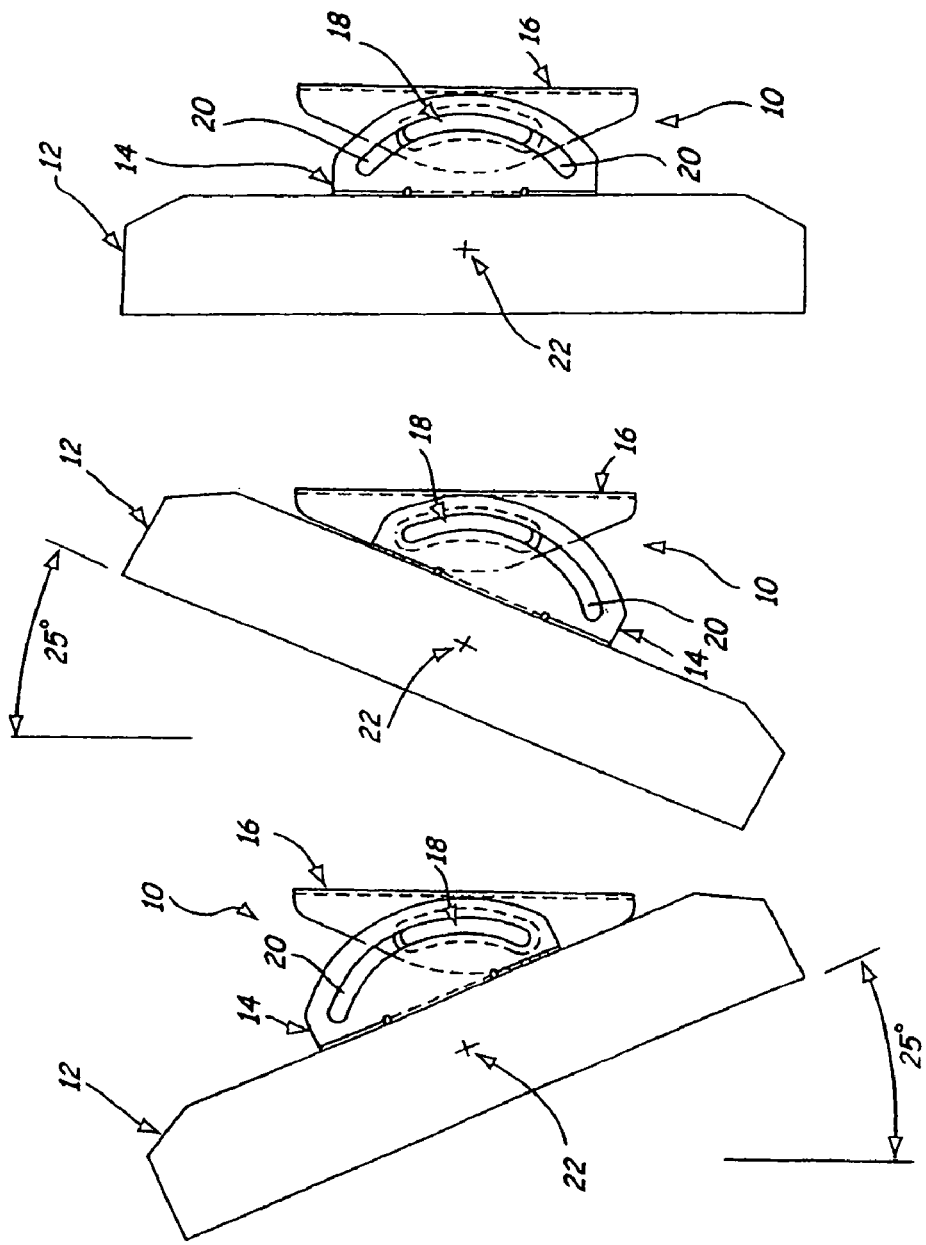

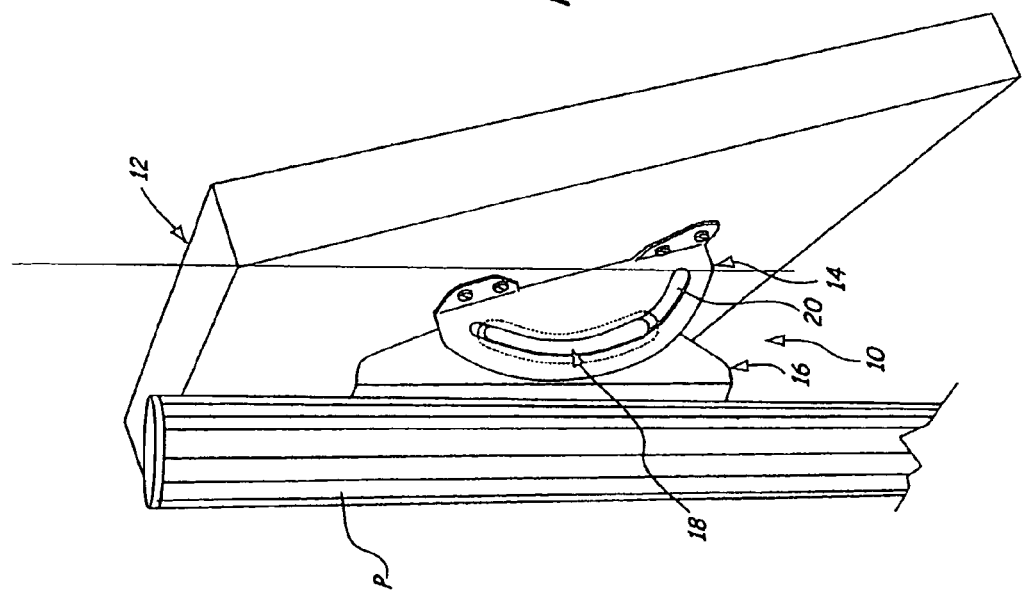

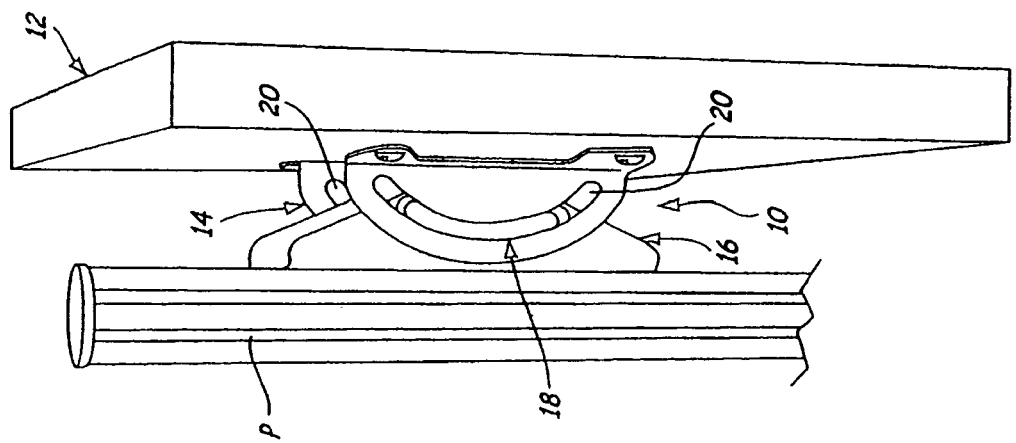

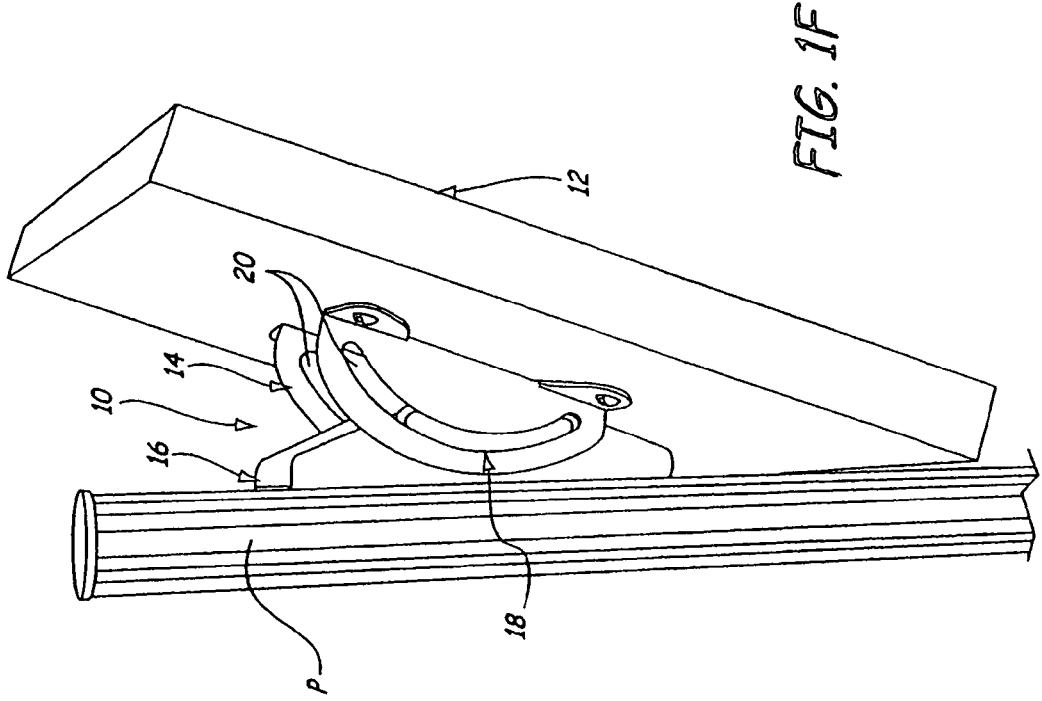

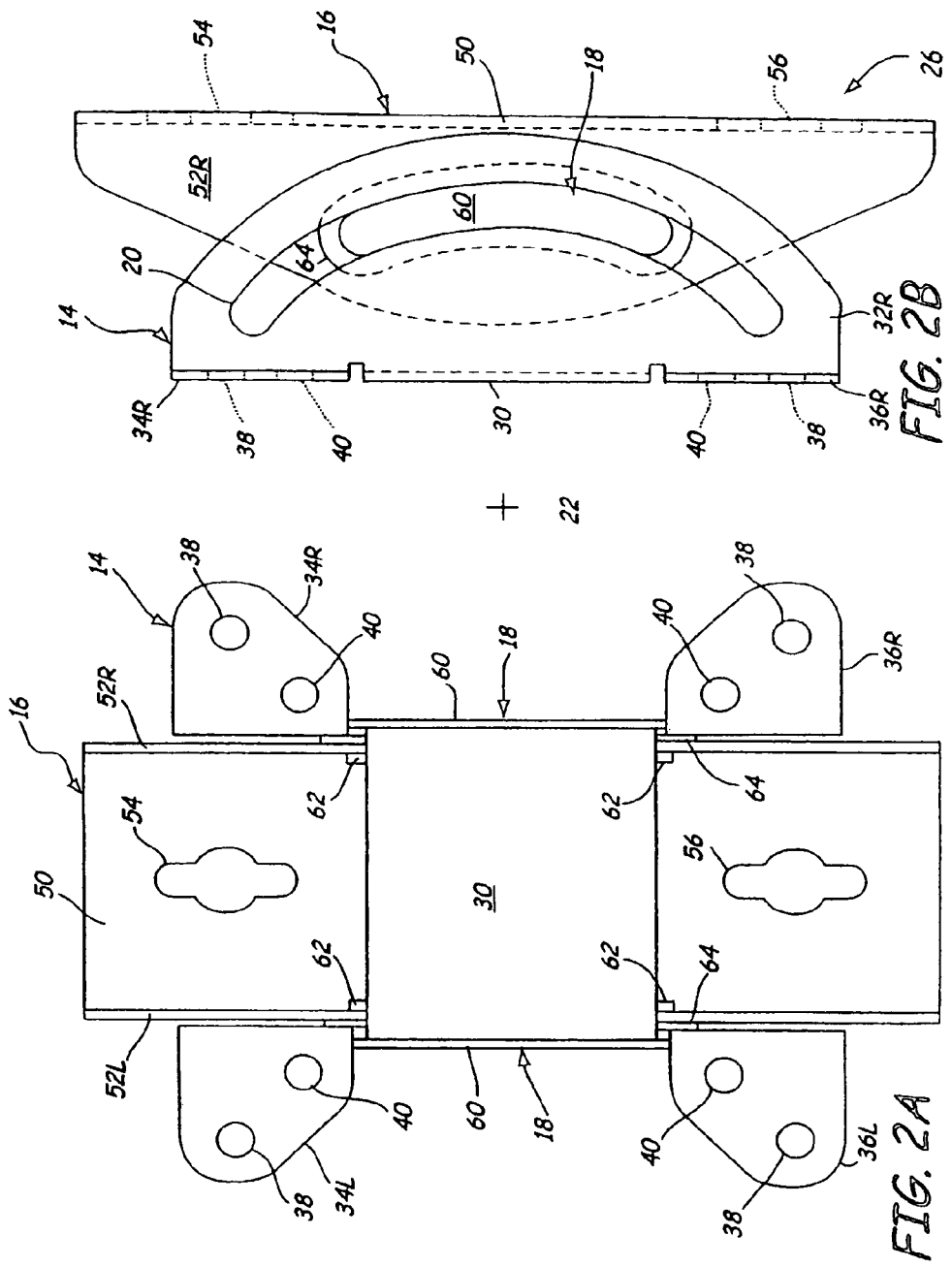

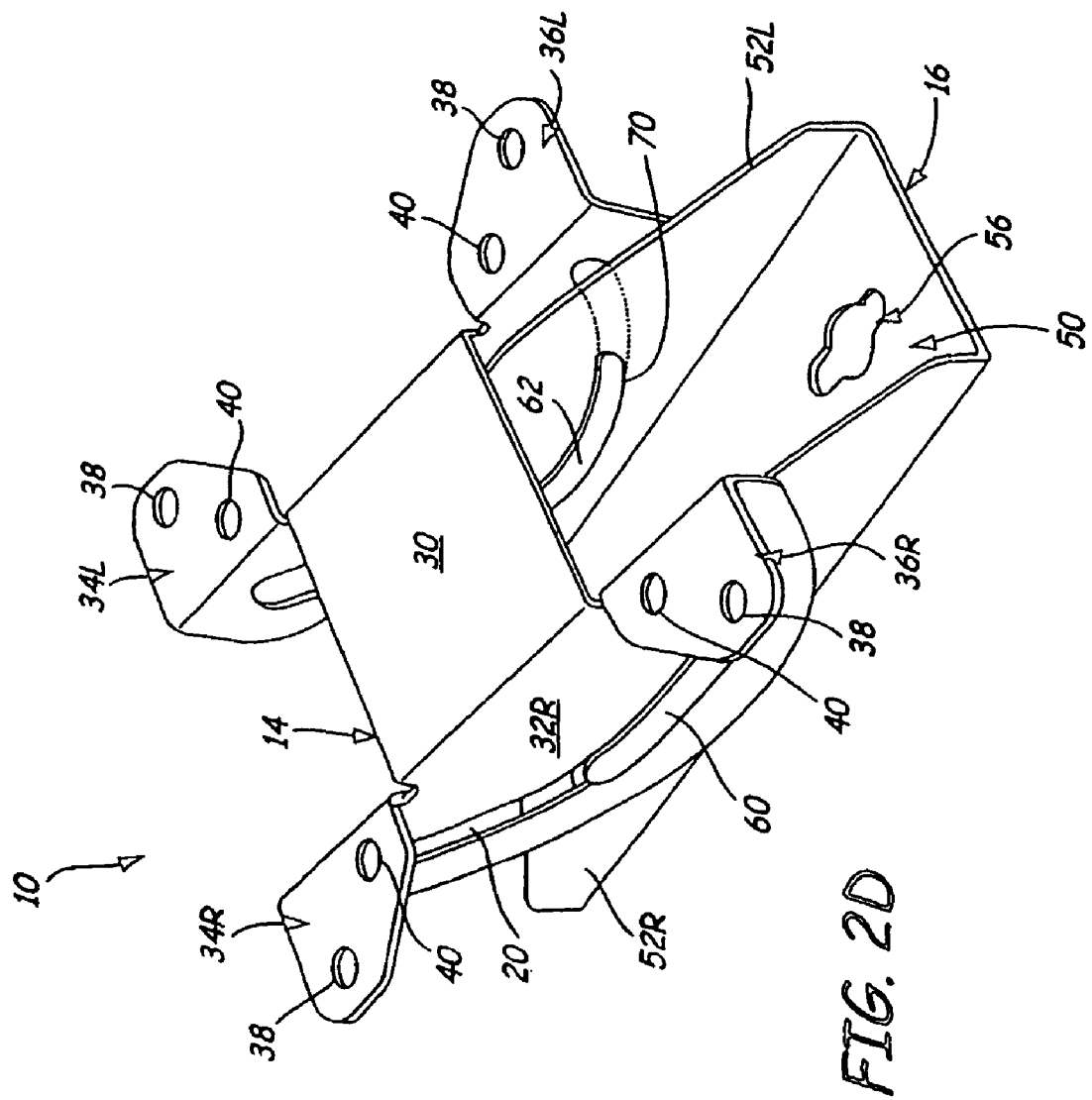

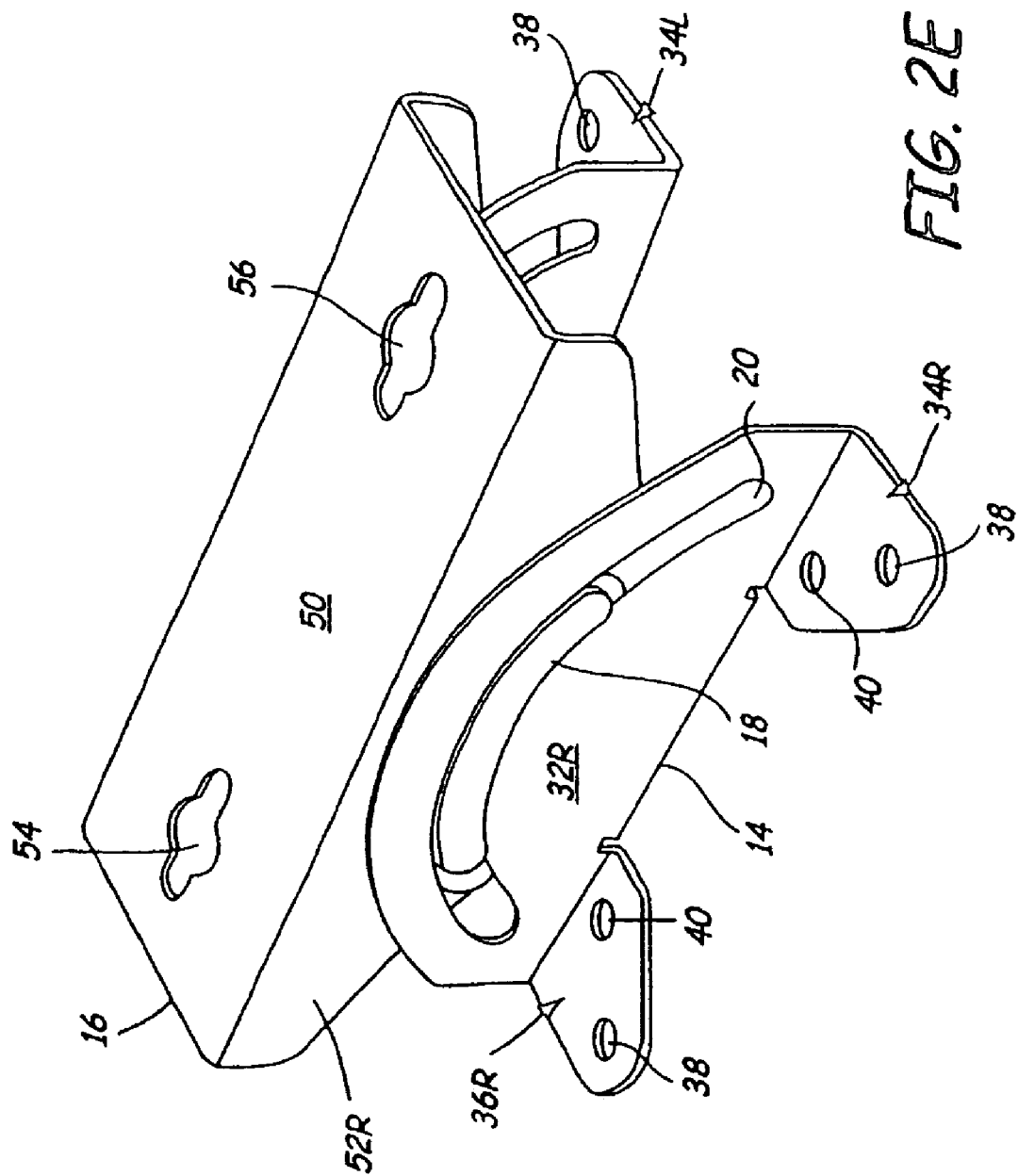

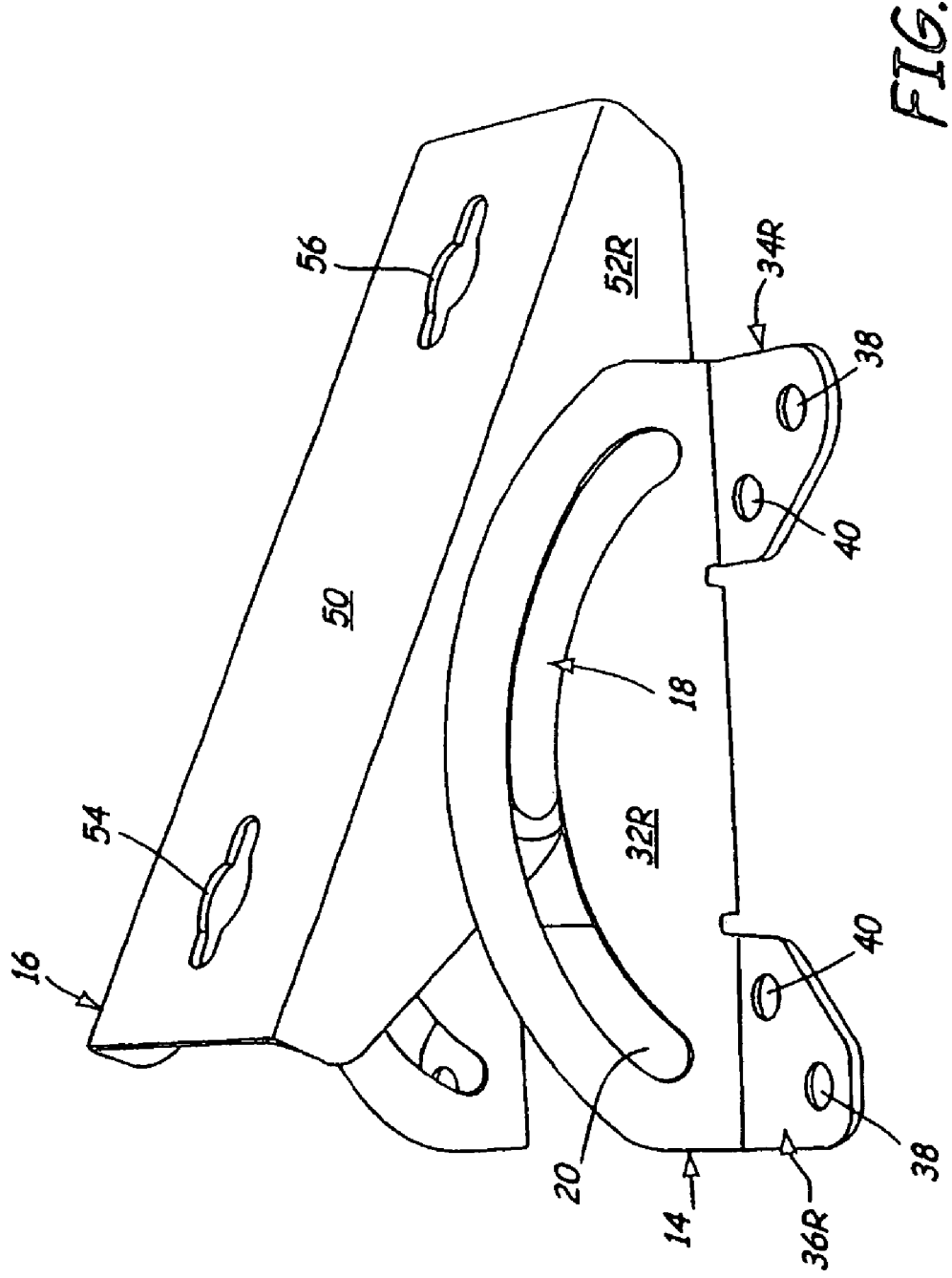

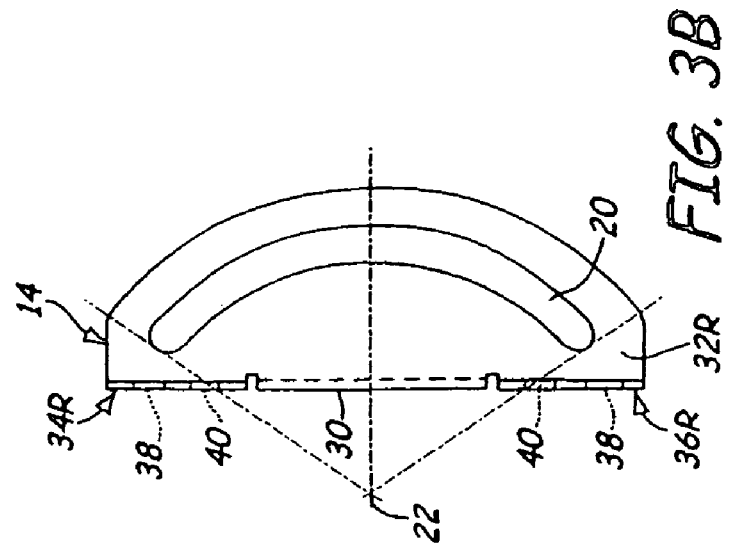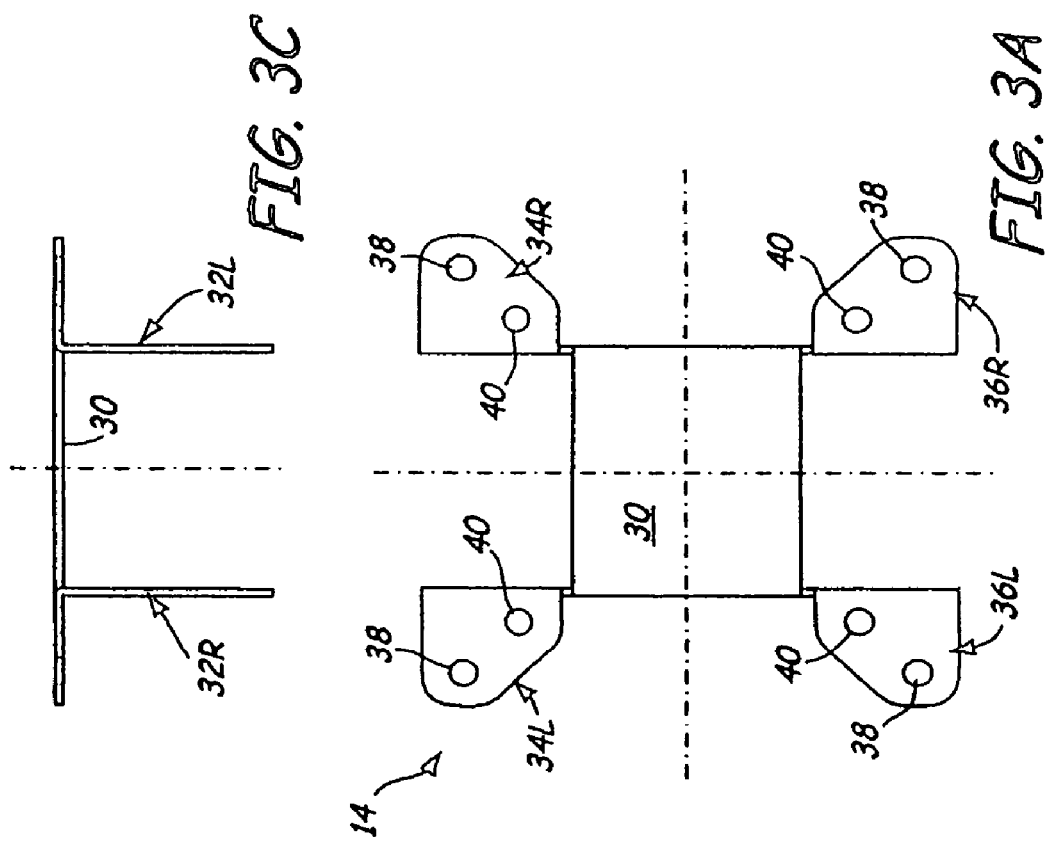

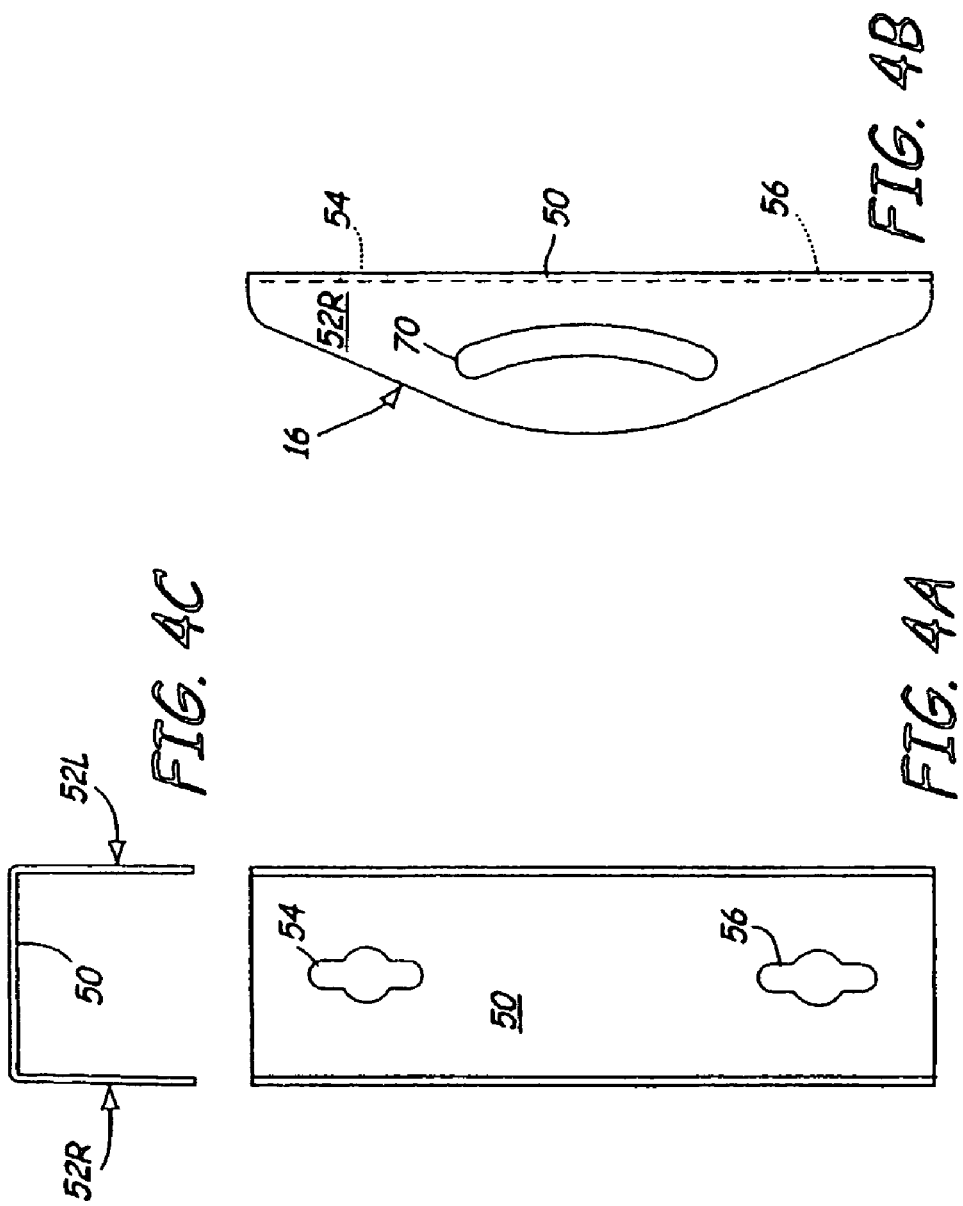

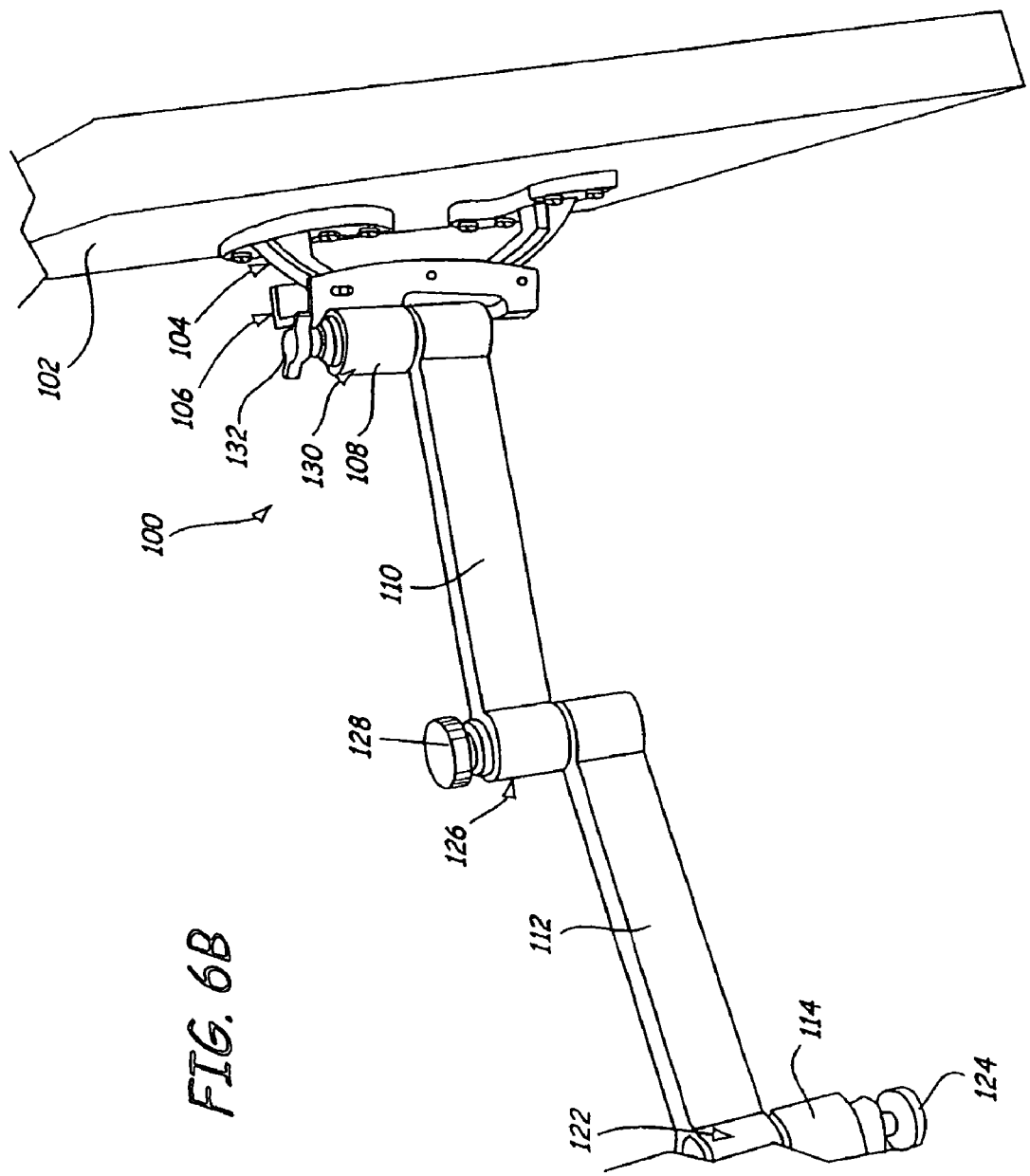

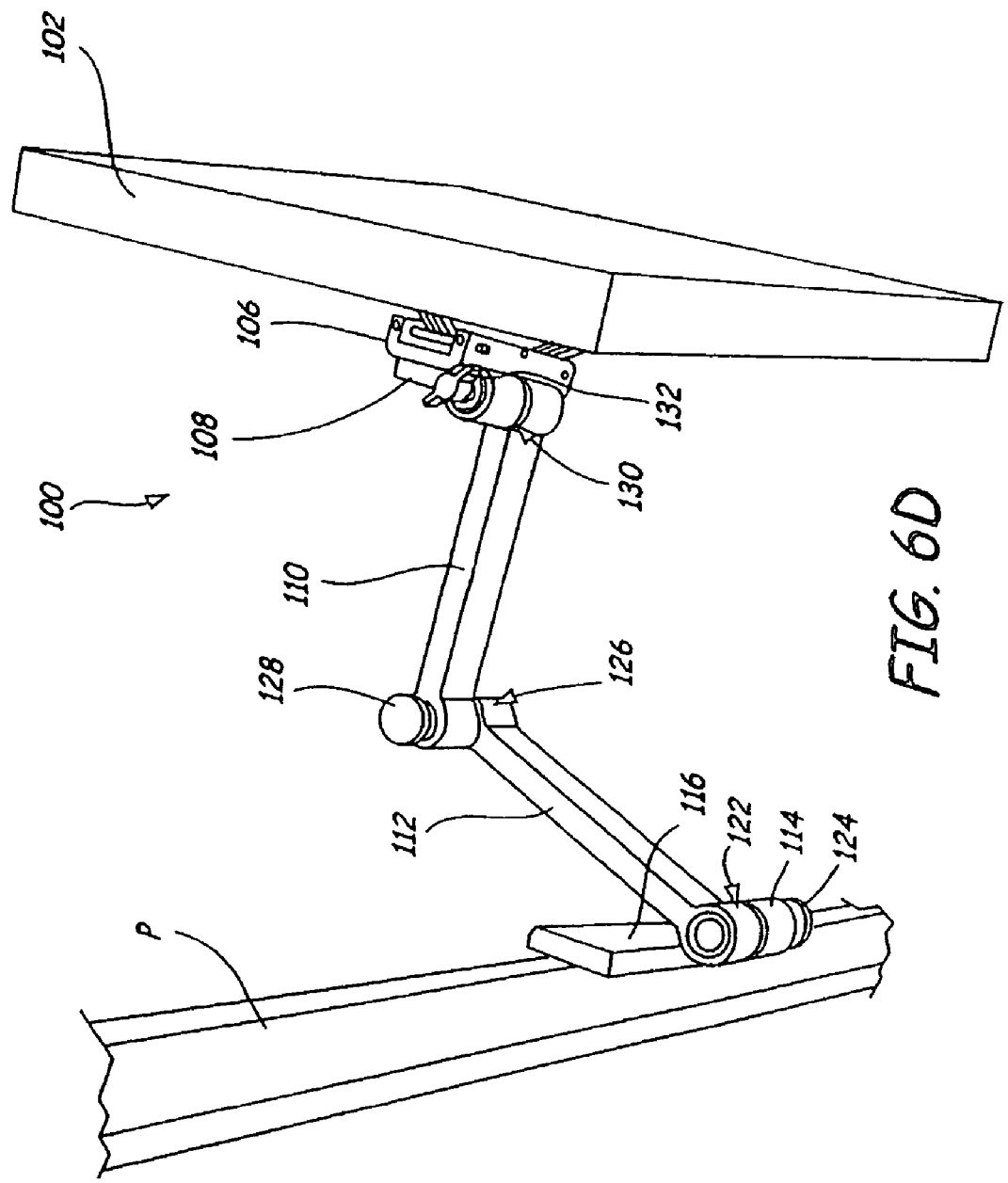

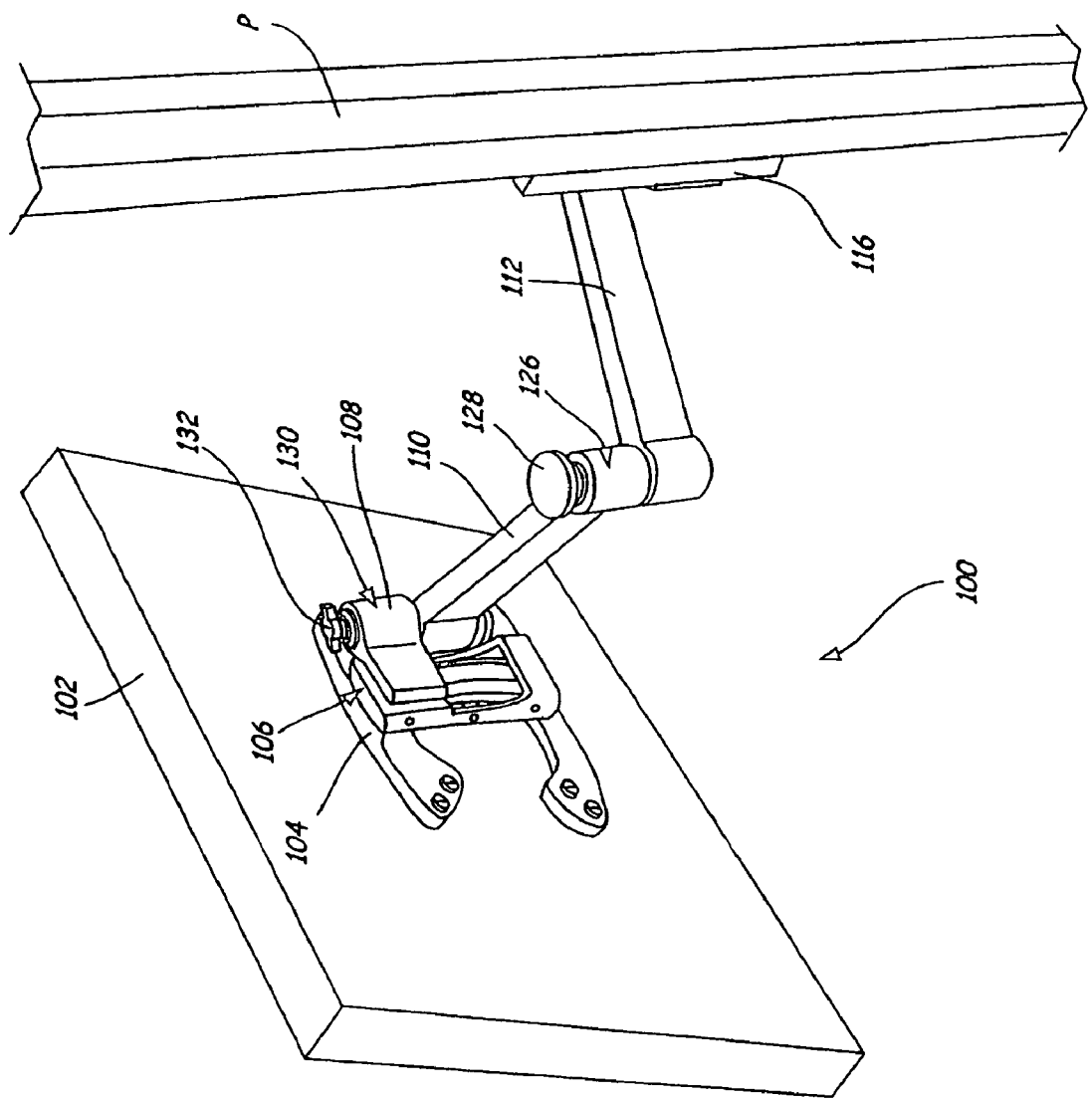

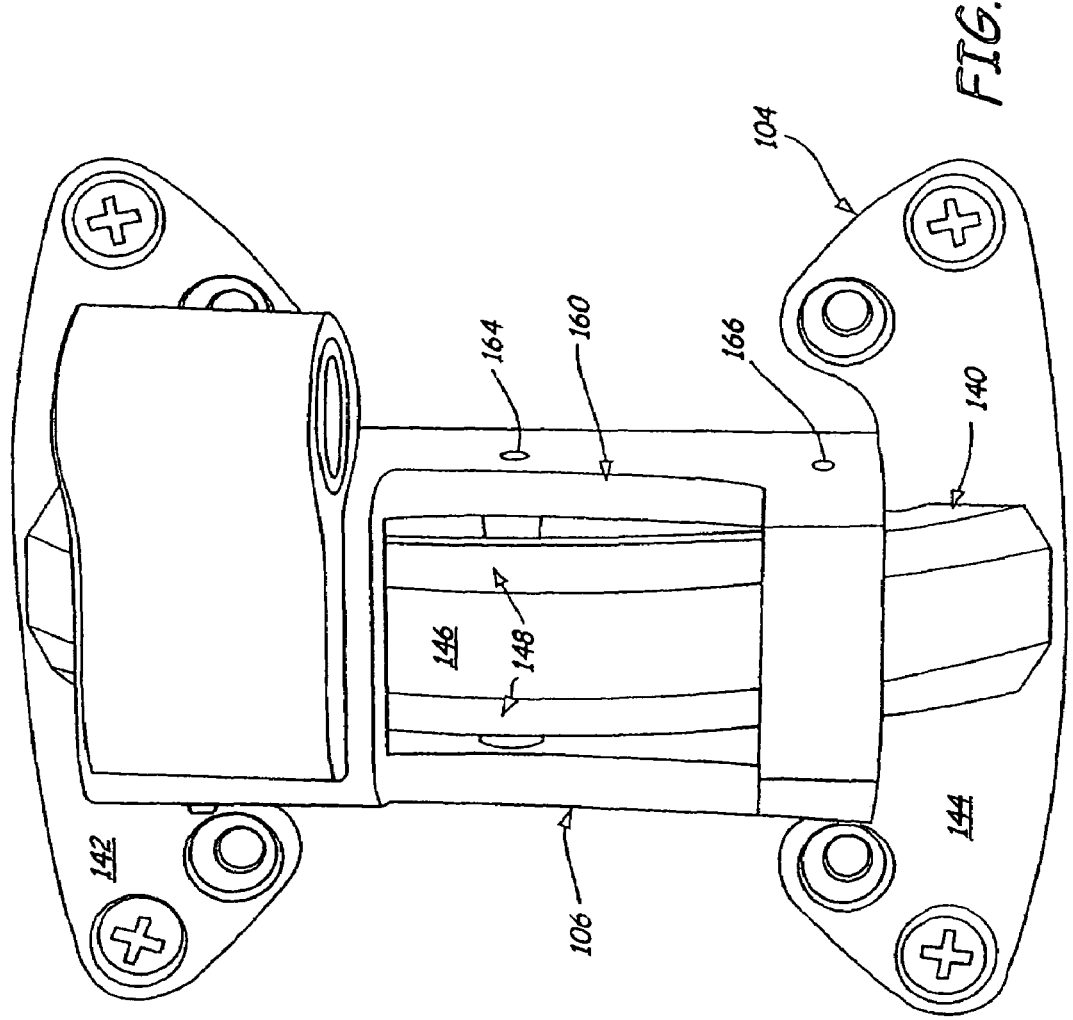

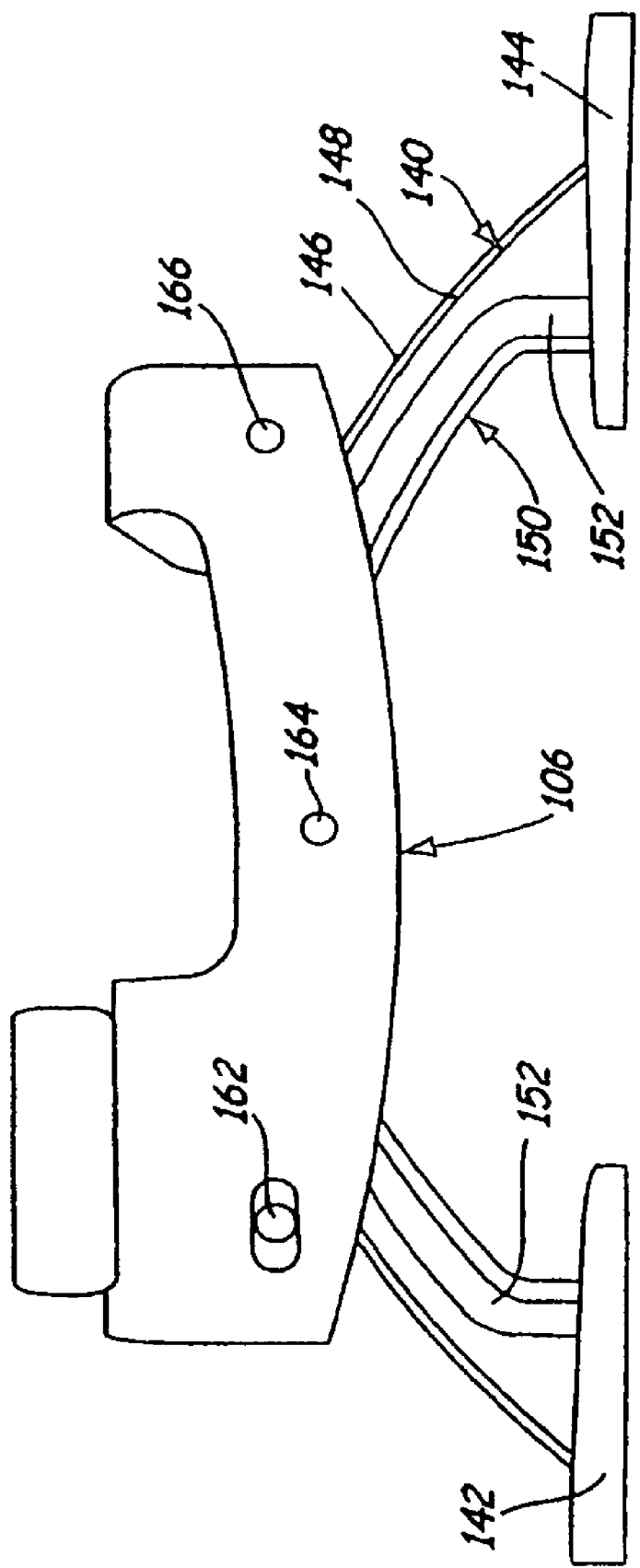

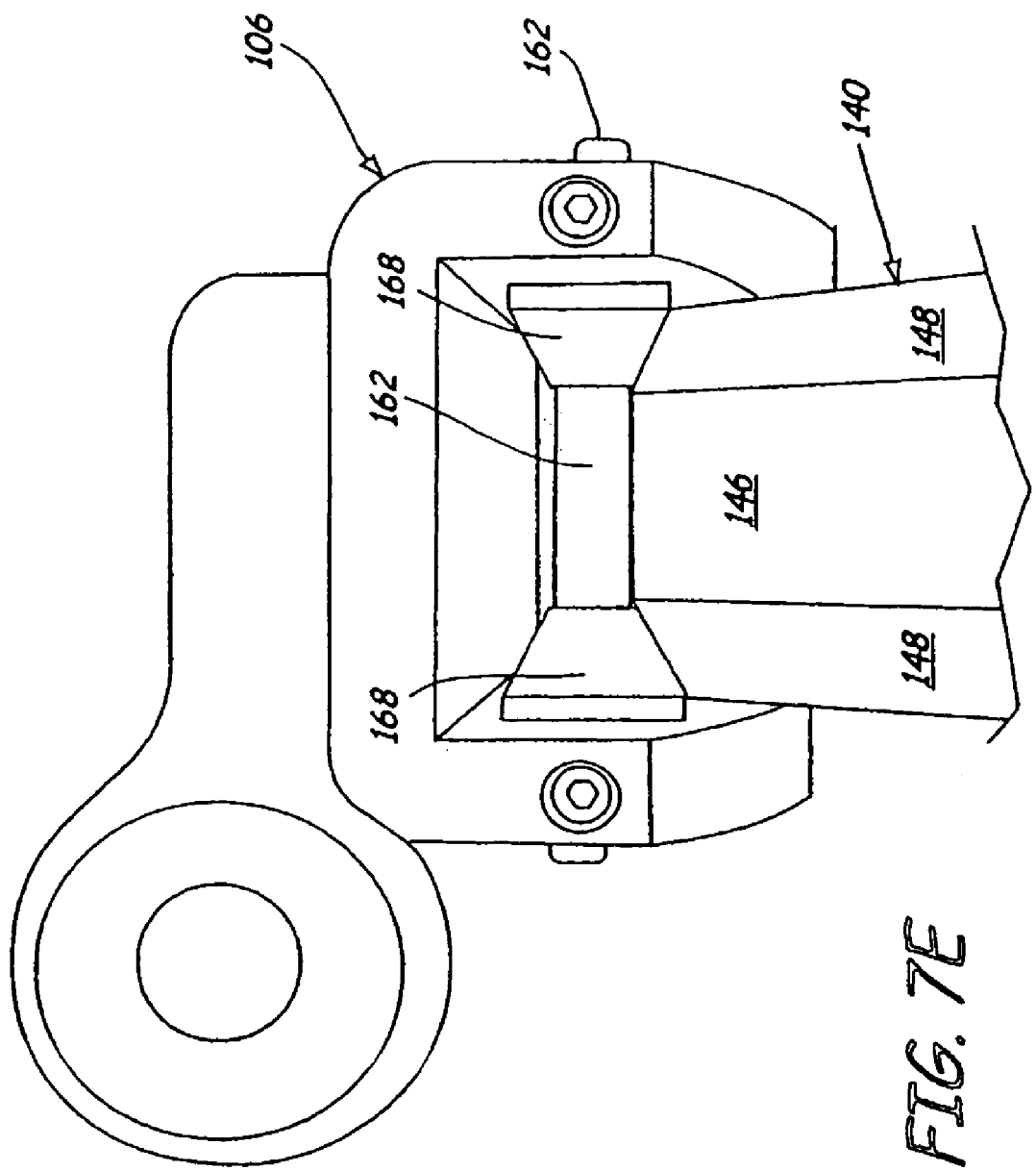

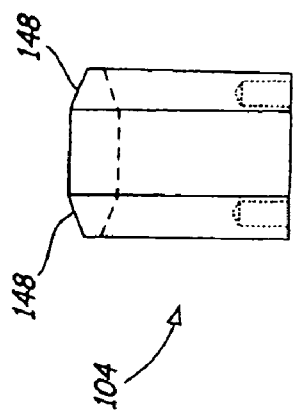
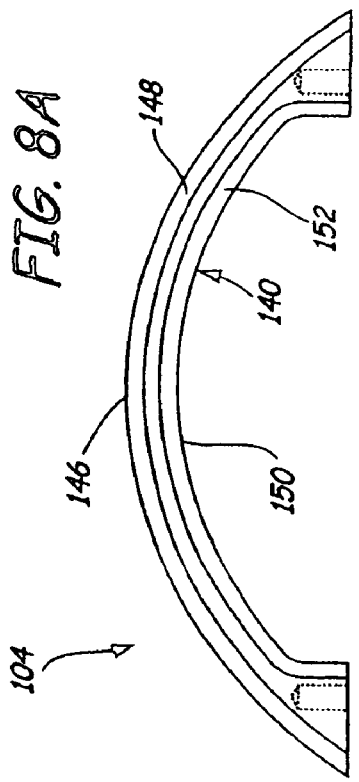
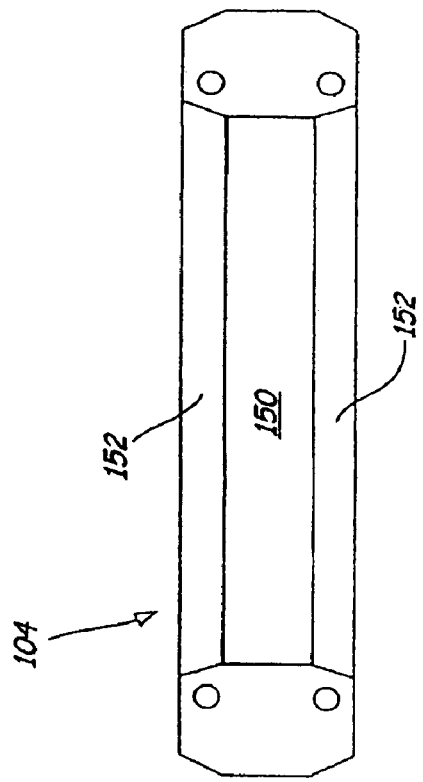

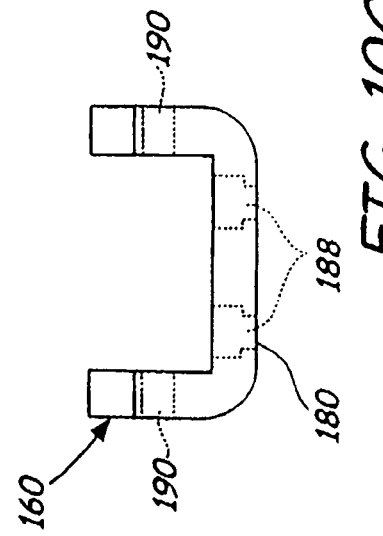
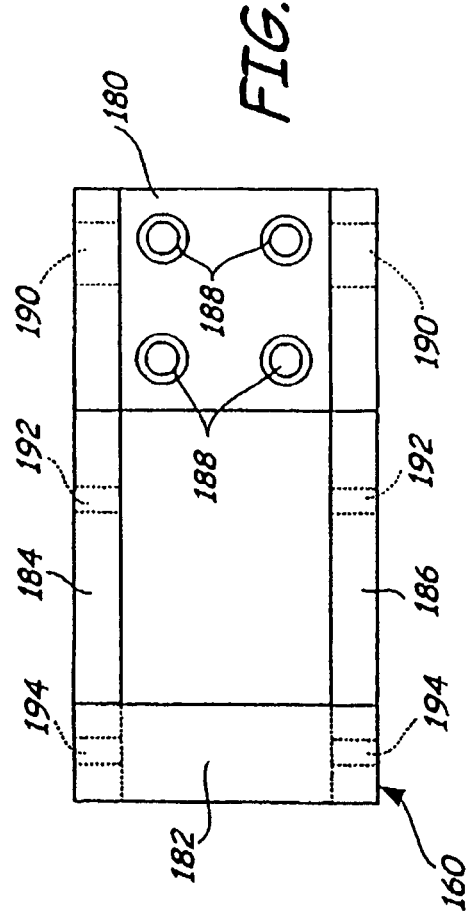
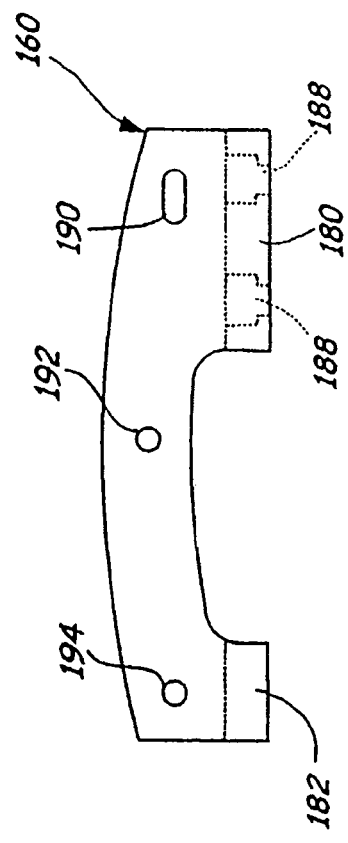

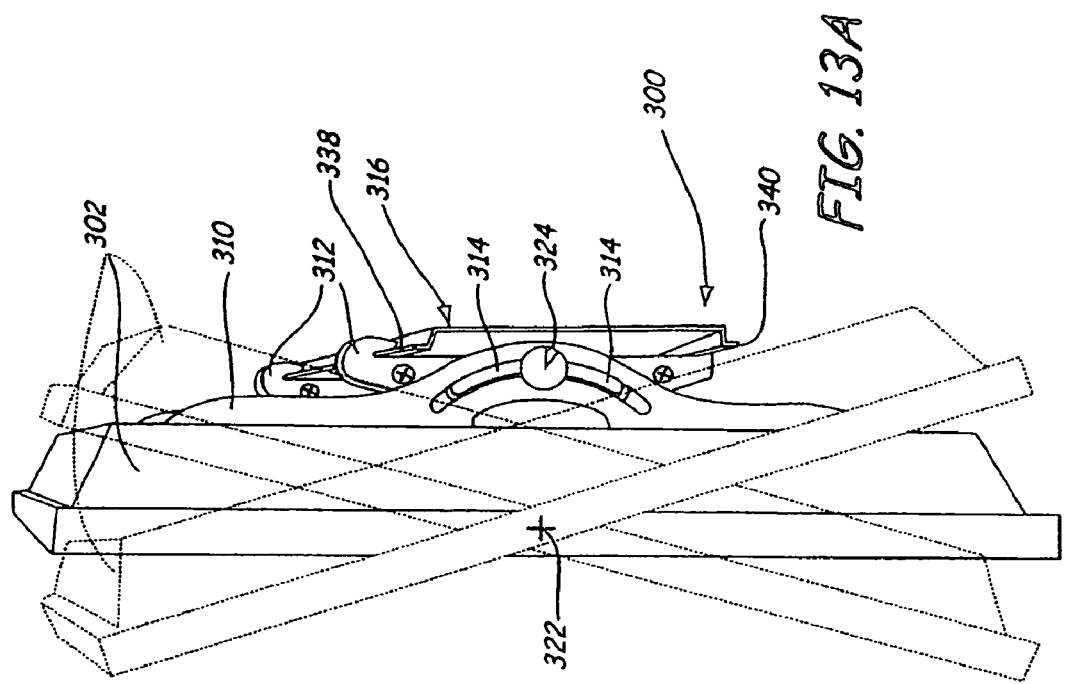

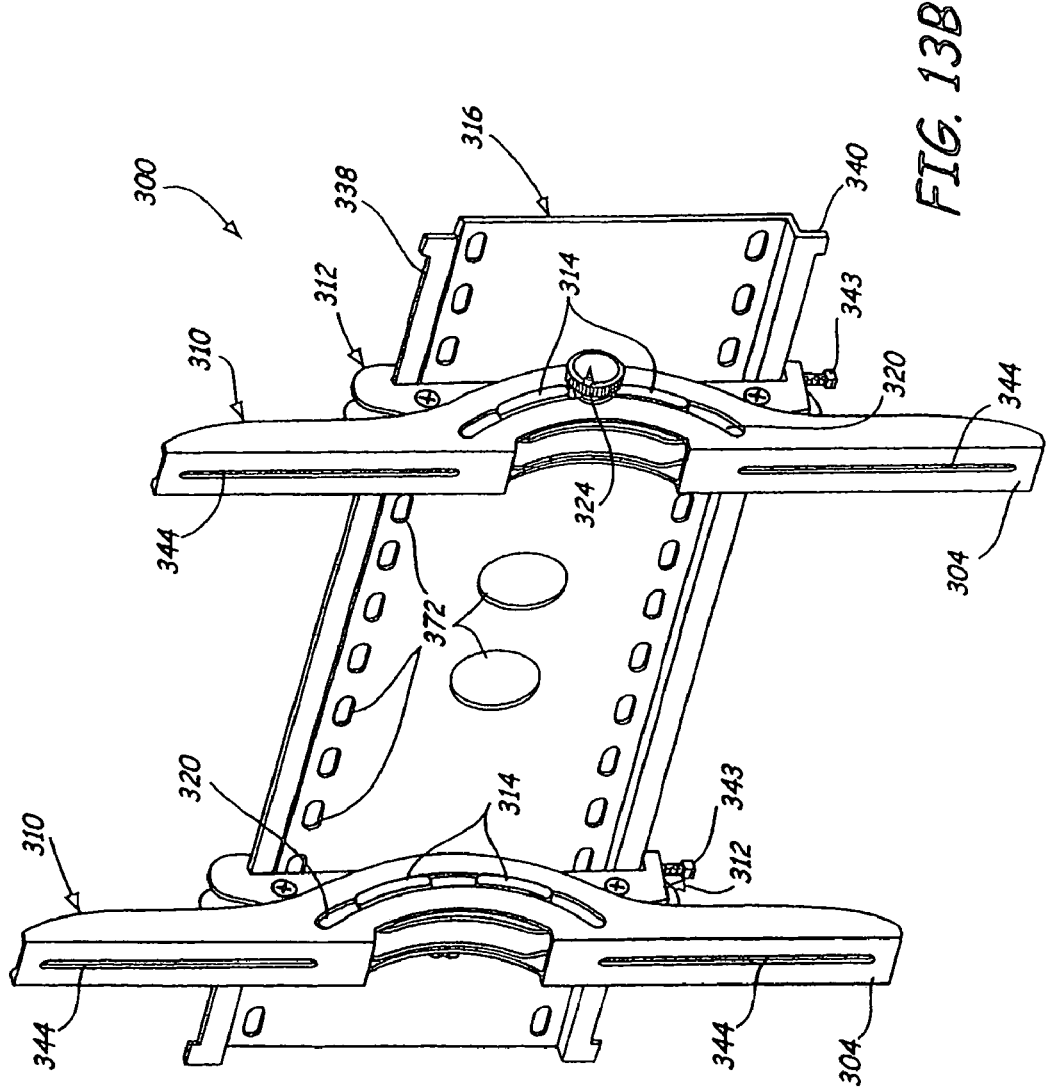

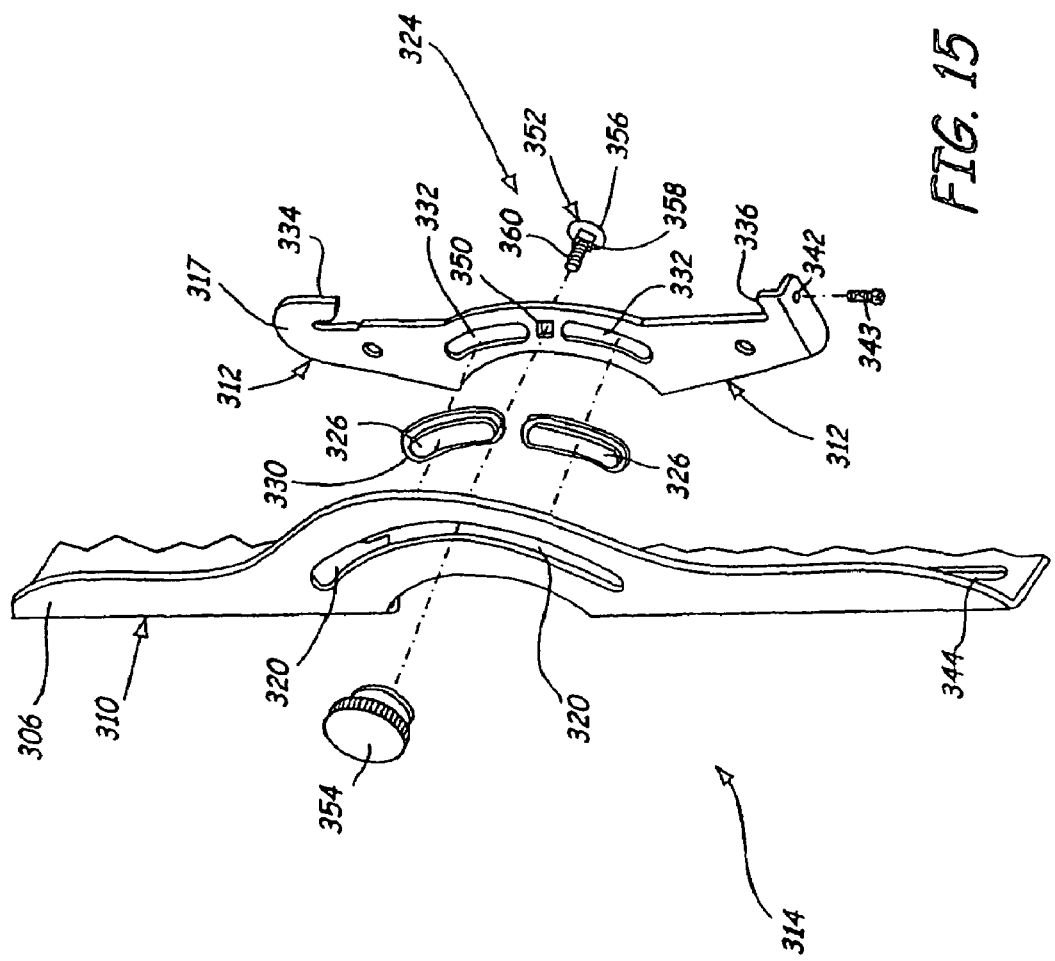

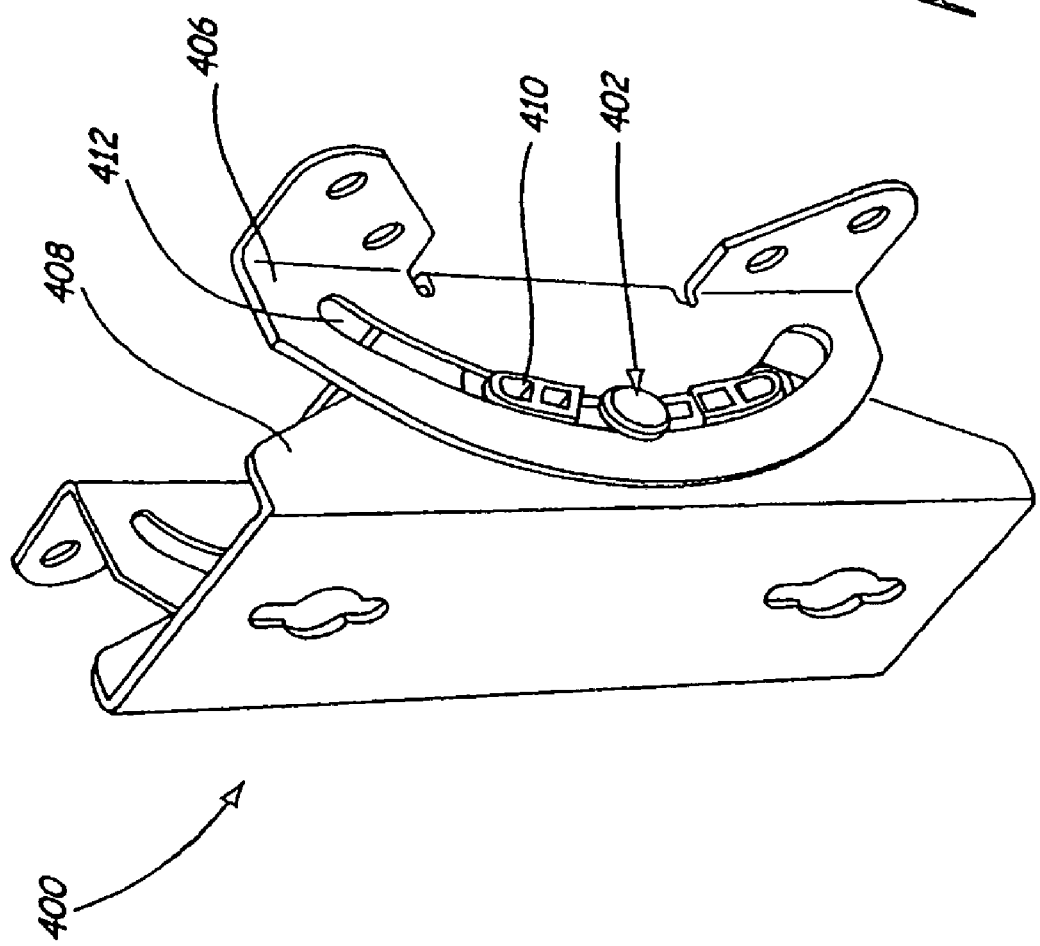

ADJUSTABLE TILT MOUNT

CROSS REFERENCE TO RELATED APPLICATIONS

This application is a continuation of U.S. patent application Ser. No. 11/194,298, filed Aug. 1, 2005 which is a continuation of U.S. patent application Ser. No. 10/455,624, filed Jun. 6, 2003, which claims priority to U.S. Provisional Pat. App. No. 60/438,889, filed Jan. 9, 2003.

BACKGROUND OF THE INVENTION

The present invention relates to mounts for interface devices such as computer monitors and televisions. In particular, the present invention relates to a mount which allows the interface to be tilted about a generally horizontal pivot axis.

The development of flat panel computer monitors and flat screen televisions offers the opportunity to replace large computer monitors and large television sets with displays having the same screen area but only a small fraction of the depth and weight. This allows computer monitors to be placed on desks without consuming a large portion of the desk top space. Similarly, flat screen televisions can be placed in locations which were previously not practical locations.

The light weight and thin profile of the flat panel monitors and televisions allows them to be supported on a relatively small base, be hung on a wall, or to be supported by a support system which is connected to a mounting surface such as a wall, a post, or a top, bottom, or side surface of a desk or cabinet. The ability to adjust the orientation of the flat panel display with respect to the viewer is a desirable feature. There is a need for mounting systems which will allow adjustment of the position and the orientation of the display. The support systems should be simple and easy to use, and should be stable so that the display remains in the position and orientation selected.

BRIEF SUMMARY OF THE INVENTION

A mounting system for an interface device such as a flat panel display (such as a computer monitor or television) allows the display to be tilted about a horizontal pivot axis which passes through a center of gravity of the display. The system includes a support and a mount which are connected together so that they can slide with respect to one another through an arc path which has the pivot axis at its center. The mount is attached to the back side of the display, while the support is connected directly or indirectly to a support surface.

The display can be tilted about the pivot axis, which is parallel to the front surface of the display, through a range of angles defined by the arc. Because the pivot axis passes through the center of gravity of the display, the weight of the display is balanced in any one of the angular positions. No clamping or other adjustment is required to hold the display in any one of its tilted positions.

BRIEF DESCRIPTION OF THE DRAWINGS

FIGS. 1A-1C are side views showing a first embodiment of the mounting system of the present invention with a flat panel display tilted at three different positions.

FIGS. 1D-1F are perspective views showing the display tilted at three different positions.

FIGS. 2A and 2B show front and side views of the mounting system of FIGS. 1A-1F.

FIGS. 2C-2F show perspective views of the mounting system.

FIGS. 3A-3C show front, right side, and top views of the mounting bracket of the system of FIG. 2A-2B.

FIGS. 4A-4C show front, right side, and top views, respectively, of the wall or support bracket of the system of FIGS. 2A-2B.

FIGS. 6A-6G show views of a second embodiment of the mounting system of the present invention with a flat panel display tilted in three different positions.

FIGS. 7A-7F show views of the second embodiment of the mounting system of the present invention.

FIGS. 8A-8C are side, top, and back views, respectively, of an arch of the mounting system of FIGS. 7A-7F.

FIGS. 10A-10C are front, side and top views of a yoke of the system of FIGS. 7A-7F.

FIGS. 13A and 13B are perspective views of a third embodiment of the present invention.

FIG. 15 is a broken, exploded view of the mount and support bracket of the third embodiment of the invention.

FIGS. 16A-16C are perspective, front, and bottom views of a fourth embodiment of the present invention.

DETAILED DESCRIPTION OF THE INVENTION

Figure 2C:
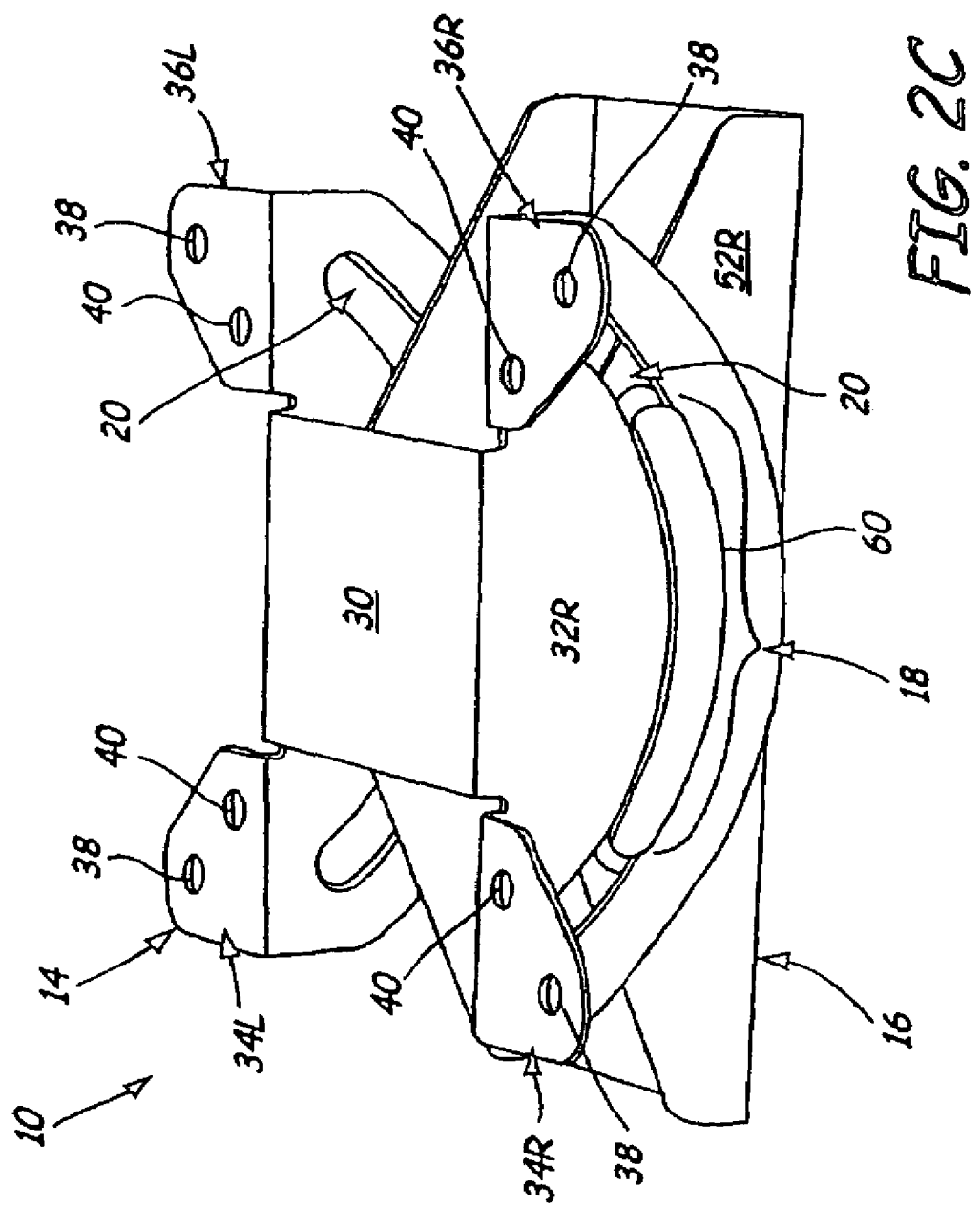

FIGS. 1A-1F show a first embodiment of mounting system 10 of the present invention. In FIGS. 1A-1F, mounting system 10 supports display 12, which is a flat panel computer monitor or television at three different positions with respect to vertical.

Mounting system 10 has three major parts, mount bracket 14, support or wall bracket 16, and a pair of glides 18. Mount bracket 14 is attached to a back surface of monitor 12, while support 16 is connected either directly or indirectly to a support surface such as post P (or a wall).

Mount bracket 14 has a pair of arcuate slots 20 which define the range of sliding motion of mount bracket 14 with respect to support bracket 16. Glides 18 are carried by support bracket 16 and project into slots 20. Glides 18 ride within slots 20 to allow a sliding movement of mount 14 with respect to support 16. The path of the sliding movement is defined by the arc of slots 20. In the embodiment shown in FIGS. 1A-1F, the extent of angular rotation permitted by sliding movement is approximately 50.degree.

The arc defined by slots 20 is a portion of a circle having its center defining a horizontal pivot axis 22. As shown in FIGS. 1A-1F, pivot axis 22 is a virtual pivot axis that passes approximately through a center of gravity of display 12. As a result, the weight of display 12 remains balanced about pivot axis 22, regardless of the tilt angle. There is sufficient friction between glides 18 and slots 20 so that display 12 will remain at whatever tilt angle the user selects.

The present invention provides a very simple and inexpensive mounting system which allows tilting of display 12 over a wide range of tilt angles. Although the embodiment shown limits the range of tilt angles to approximately 50 degrees, the range could be either larger or smaller depending upon the length of the arc defined by slots 20.

As shown in FIGS. 2A-2F, mount 14 includes face 30, right side wall 32R, left side wall 32L and mounting ears 34R, 34L, 36R and 36L. Each of the mounting ears 34L, 34R, 36L, and 36R include an outer mounting hole 38 and an inner mounting hole 40. Arc slots 20 are located in left and right side walls 32R and 32L, and are aligned with one another. The curvature of slots 20 define a portion of the circle having a center at pivot axis 22 shown in FIG. 2B.

Support 16 is a generally U-shaped bracket formed base 50, right side wall 52R, and left side wall 52L. Mounting slots 54 and 56 are used to connect support 16 to a wall, a post, or other support. As seen in FIGS. 2A-2F, side walls 32R and 32L of mount 14 straddle walls 52L and 52R of support 16. Glides 18 are captured between the side walls of mount 14 and support 16. Each glide 18 includes outer projection 60, inner projection 62, and central flange 64. Outer projections 60 project outward through arcuate slots 20. Inner projections 62 are similar in shape to outer projection 60, and extend through mating slots 70 (shown in FIG. 2D) through side walls 52L and 52R of support 16. The size of the arcuate slots 70 in side walls 52L and 52R generally matches the shape of inner projections 62. Flanges 64 are captured between opposing side walls 32L and 52L and 32R and 52R, respectively. As a result, glide 18 is generally held in place with respect to support 16, while mount 14 can slide back and forth along the path defined by arc slots 20 from an upper-most position defined when the upper end of slot 20 engages the upper end of outward projection 60 and a lower-most position in which the lower end of projection 60 engages the lower end of slot 20. These two extreme positions are illustrated in FIGS. 1A, 1B, 1D and 1F.

FIGS. 3A-3C show mount bracket 14 in further detail, and FIGS. 4A-4C show support bracket 16 in further detail. Dimensions of a preferred embodiment are shown in the Figures. For both support 16 and mount 14, a preferred material is 0.075 cold rolled steel (CRS 14 GA). Mount and support brackets 14 and 16 preferably have a powder coat final finish.

Figure 5B:
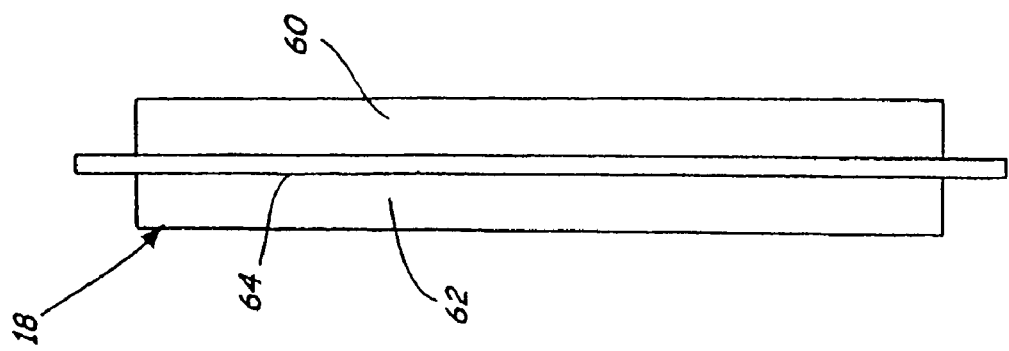
FIGS. 5A and 5B show side and front views, respectively, the glide of the system of FIGS. 2A-2B.
Figure 5A:
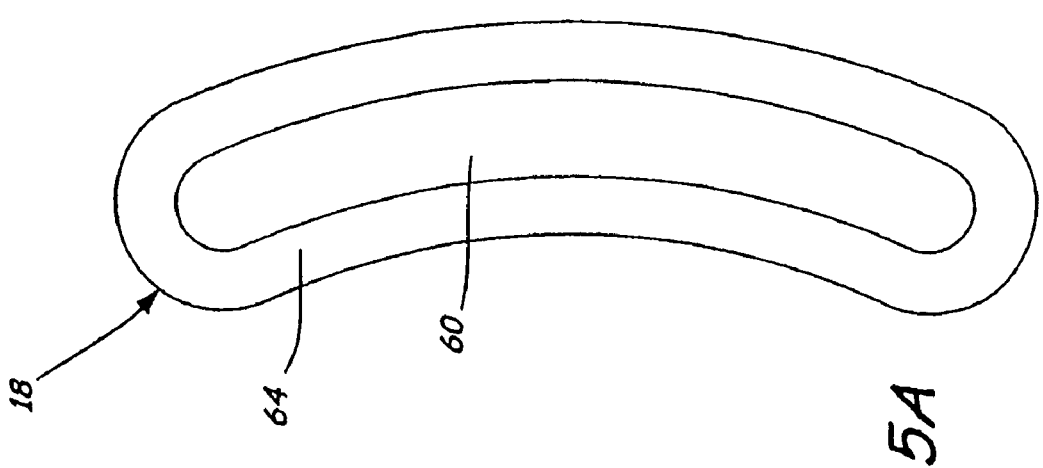
Figure 6A:
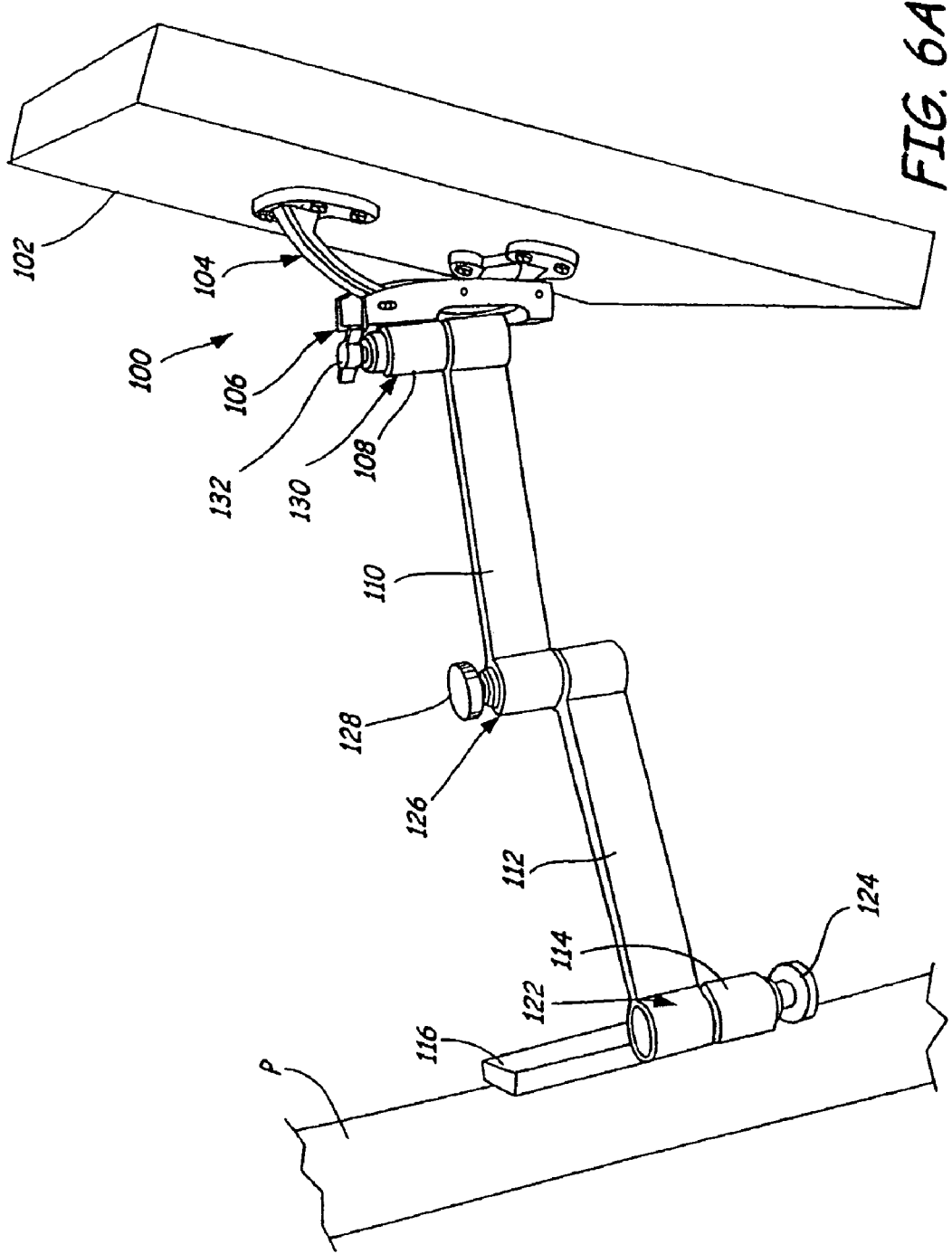
Figure 6C:
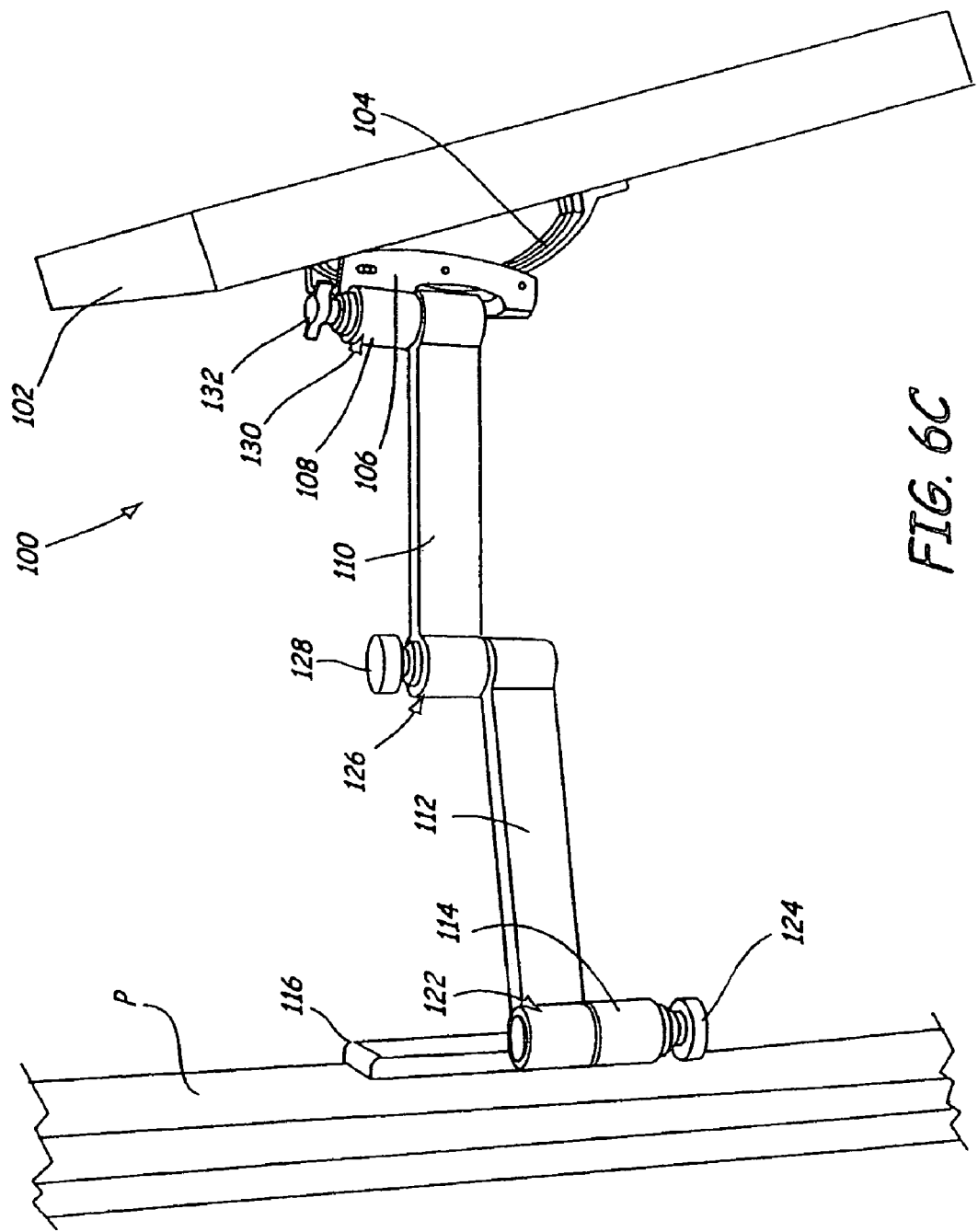
Figure 6E:
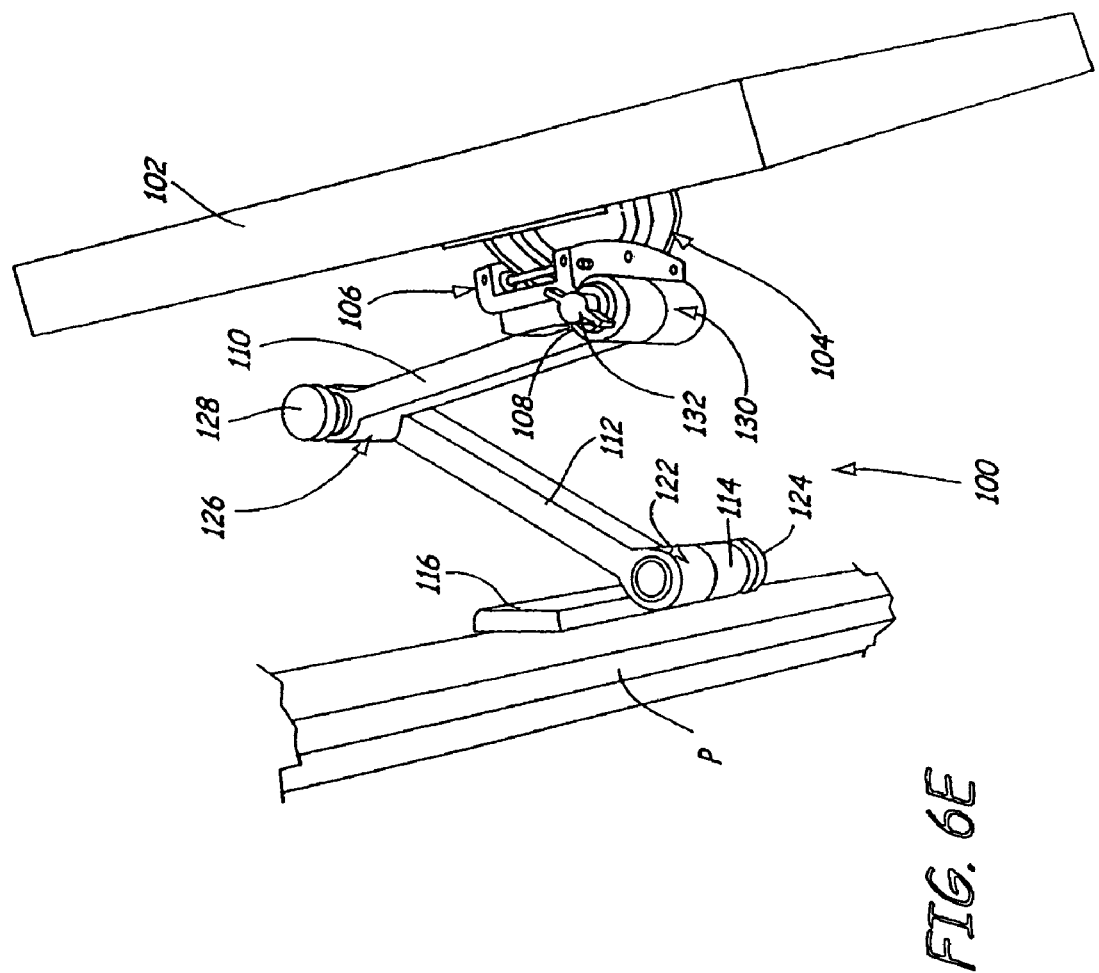
Figure 6F:
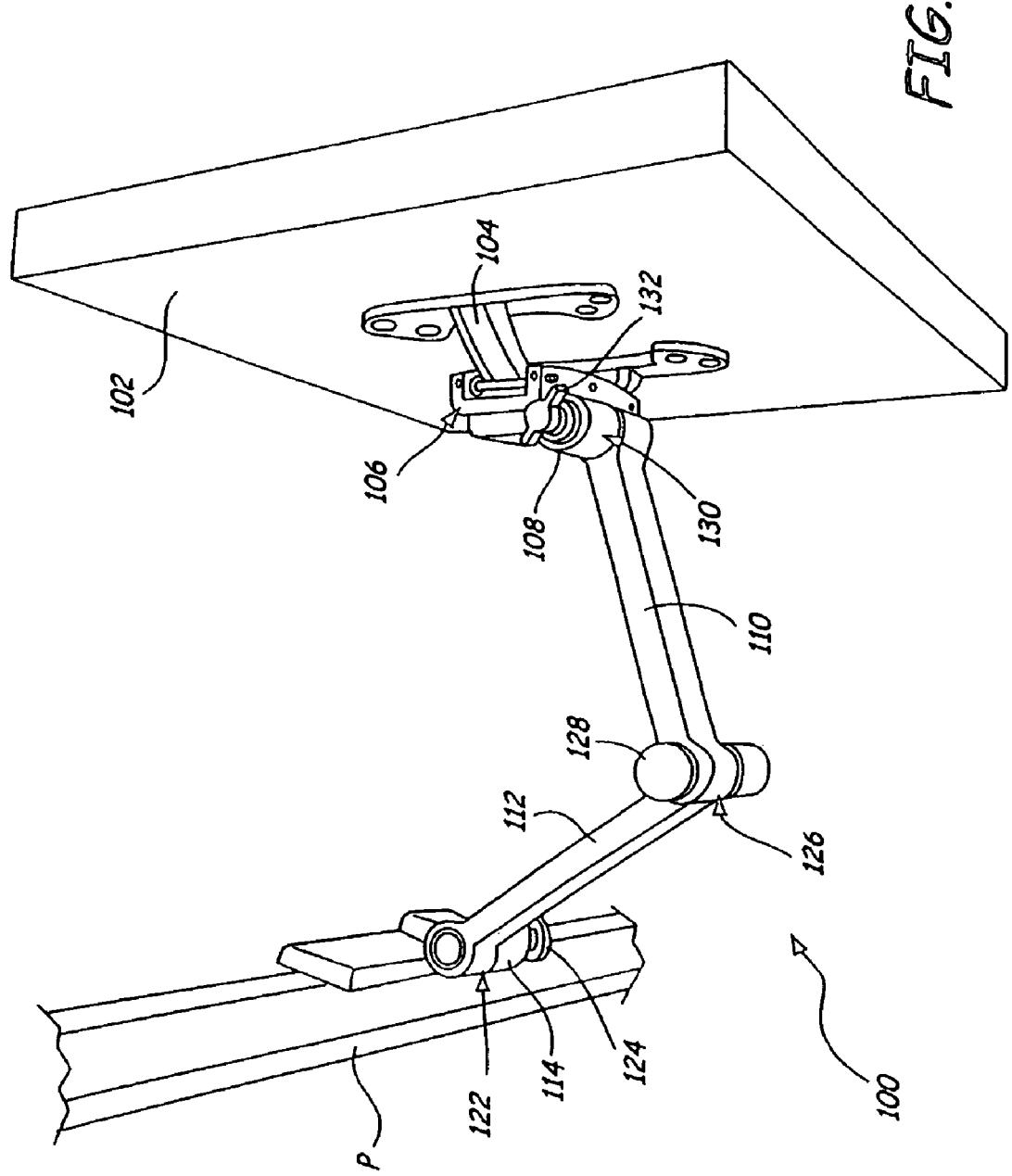
Figure 7B:
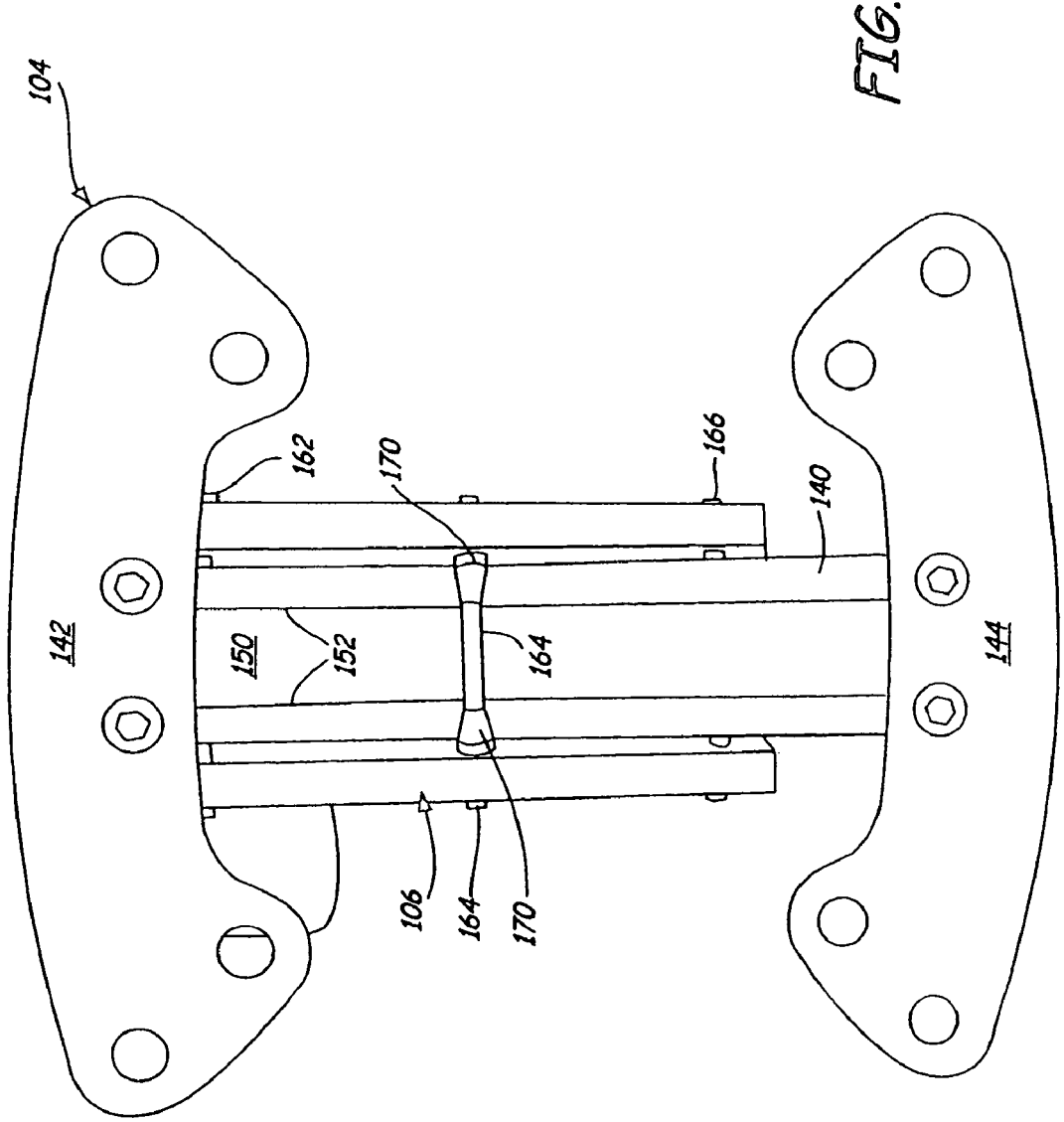
Figure 7C:
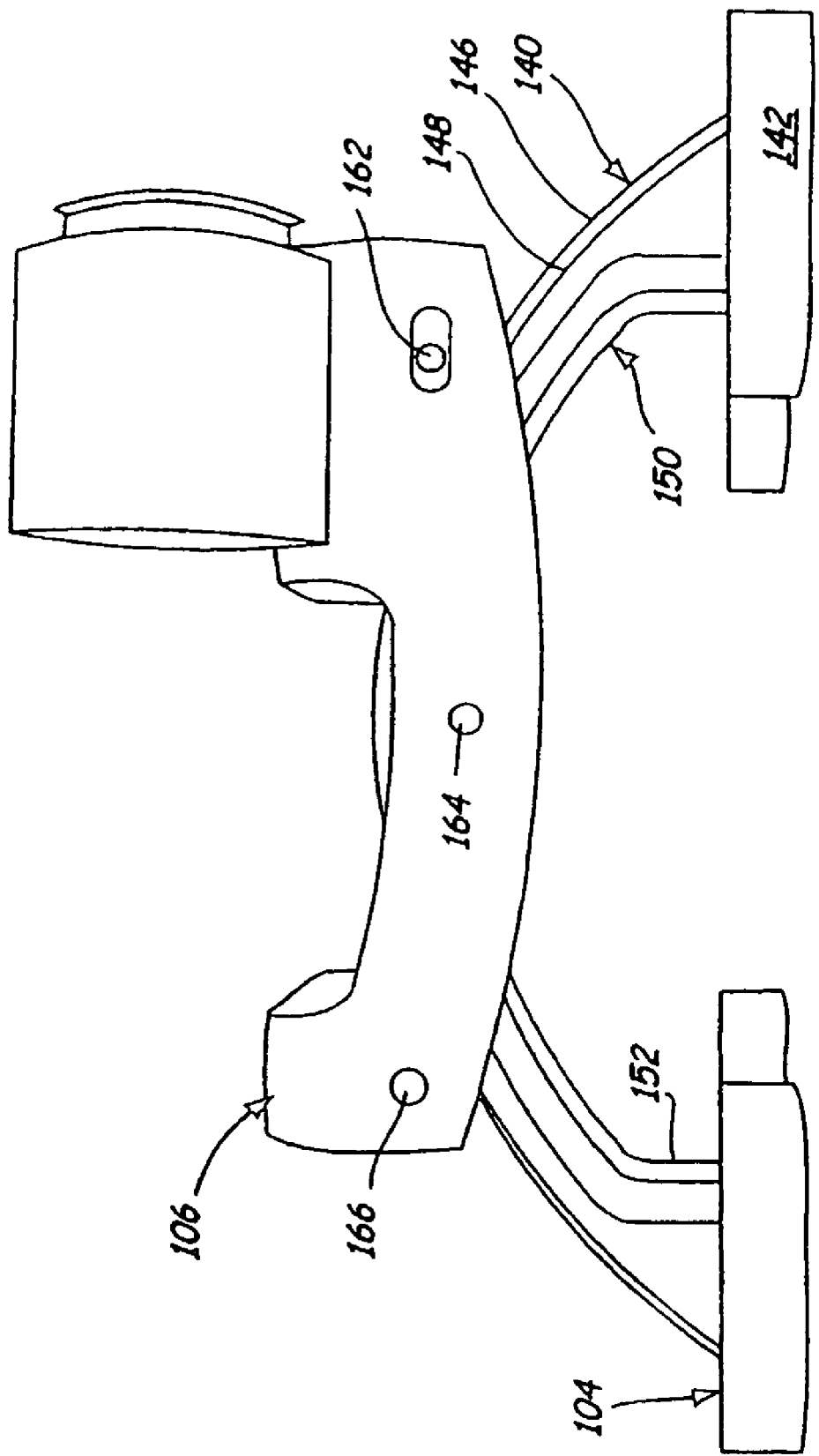
Figure 7F:
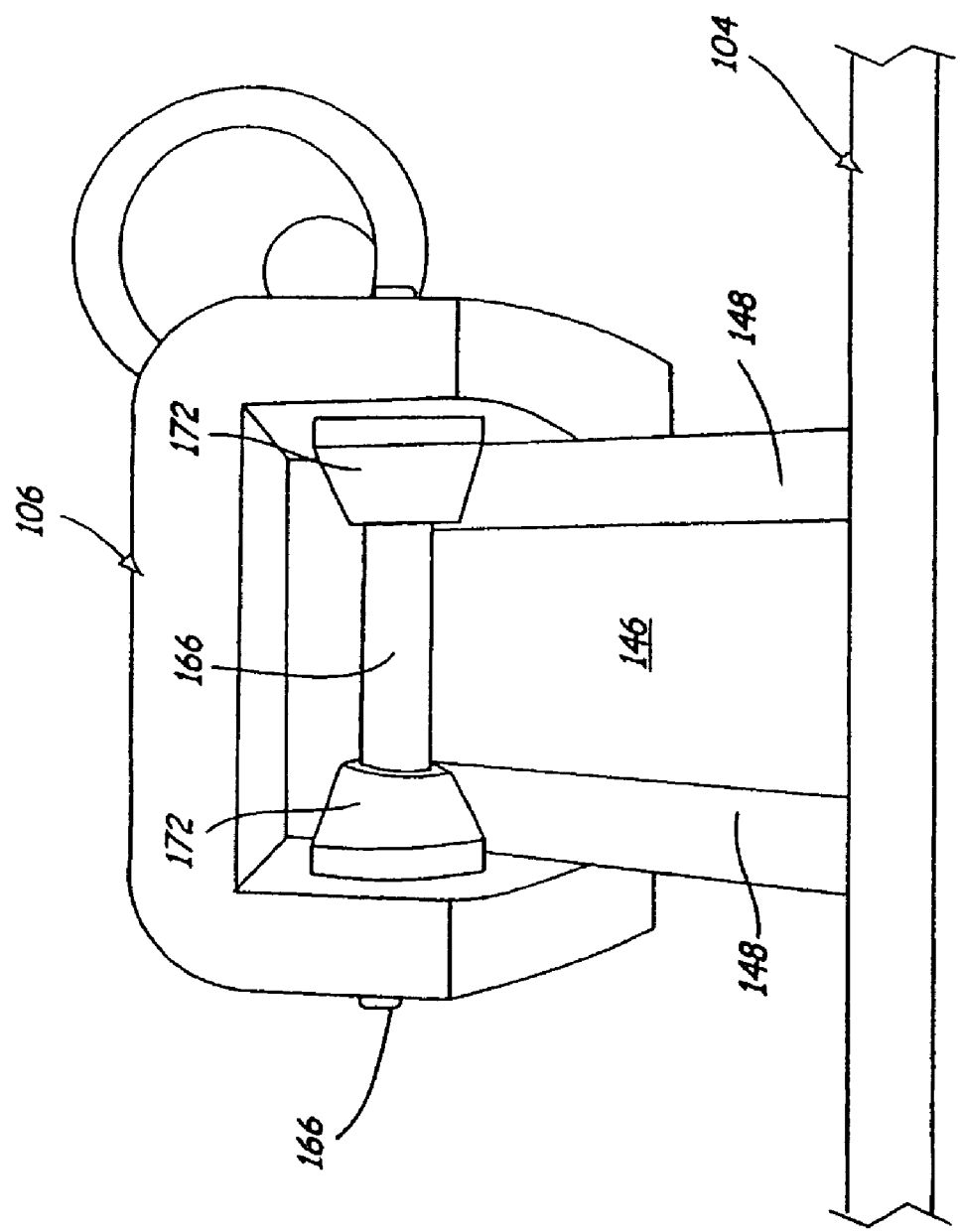

FIGS. 5A and 5B show one of the glides 18. The preferred material for slides 18 is Delrin plastic.

As shown in FIGS. 3A-3C, 4A-4C and 5A-5B, the preferred radius of the center line of slots 20 and mount 14, slots 70 in support 16, and glides 18 define a radius of curvature of 2.344 inch. This results in a location of pivot axis 22 about one inch forward of the front surfaces of base 30 and mounting ears 34L, 34R, 36L and 36R of mount 14. This location of pivot axis 22, with mount 14 attached generally in the center back of display 12, results in pivot axis 22 passing through or very nearly through the center of gravity of display 12. As a result, display 12 is weight-balanced in the various tilt positions. As configuration and weight distribution of flat screen panels changes, dimensions of the arc path may be changed to maintain weight balance.

FIGS. 6A-6G show a second embodiment of the present invention. Mounting system 100 supports display 102 in a wide variety of different positions and or orientations, as illustrated in FIGS. 6A-6G. Mounting system 100 includes mount assembly 104, support assembly 106, side knuckle 108, dog bone support arms 110 and 112, side knuckle 114, and wall plate 116.

As shown in FIGS. 6A-6G, mounting system 100 is supported from a vertical support, which in this case is pole P. Wall plate 116 is attached to pole P, and side knuckle 114 is attached to wall plate 116.

The inner end of dog bone 112 is pivotally connected to side knuckle 114 by tapered bearing 122. Adjustment screw 124 controls the drag of taper bearing 122 to control the rotation of dog bone 112 with respect to side knuckle 114.

The outer end of dog bone 112 is pivotally connected to the inner end of dog bone 110 by tapered bearing 126. Adjustment screw 128 controls the frictional drag produced by tapered bearing 126, and can be used to lock dog bones 112 and 110 in a fixed orientation if desired.

The outer end of dog bone 110 is pivotally connected by tapered bearing 130 to side knuckle 108. Adjustment screw 132 is used to adjust drag or to lock dog bone 110 and side knuckle 108 together as desired.

Support assembly 106 is attached by screws to the side arm of side knuckle 108.

Support 106 forms a sliding connection with mount 104. As in the first embodiment of the present invention, the sliding connection is defined by an arc segment of a circle which has a center defining a pivot axis of display 102. The pivot axis is positioned at or very near the center of gravity of display 102, so that display 102 is weight-balanced in the various tilt positions.

Mount 104 is attached by screws to the back surface of display 102. Because of the balance of weight about the virtual pivot axis defined by mount assembly 104 and support assembly 106, display 102 can be tilted through a range of positions as illustrated in FIGS. 6A-6G. Display 102 is stable in any of the positions, and once tilted to that position will remain in place without needing to be clamped. Mounting system 100, like mounting system 10, provides an extremely easy-to-use adjustment of tilt of a flat panel display. The user merely moves the display about the pivot axis to the desired mount of tilt, and the display will remain in the tilted position.

FIGS. 7A-7F show mount assembly 104 and support assembly 106 in greater detail.

Mount assembly 104 includes arch 140 and mounting plates 142 and 144. Mounting plate 142 is attached to one end of arch 140 by a pair of screws, and mounting plate 144 is attached to the opposite end of arch 140 by a pair of screws. Arch 140 defines an arc having as its center the virtual pivot axis which passes horizontally through display 102. Outer surface 146 has beveled edges 148 along its longitude and latitude. Similarly, inner surface 150 of arch 140 has beveled edges 152. Beveled edges 152 form parallel guide tracks for the sliding movement of arch 140 with respect to support assembly 106.

Figure 9B:
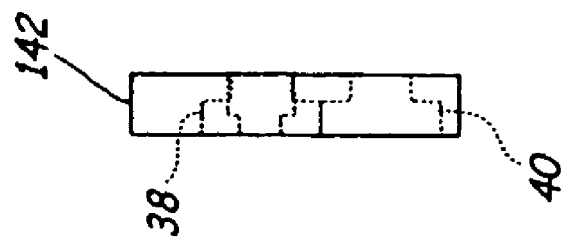
FIGS. 9A and 9B are rear and side view of a mount plate of the system of FIGS. 7A-7F.
Figure 9A:
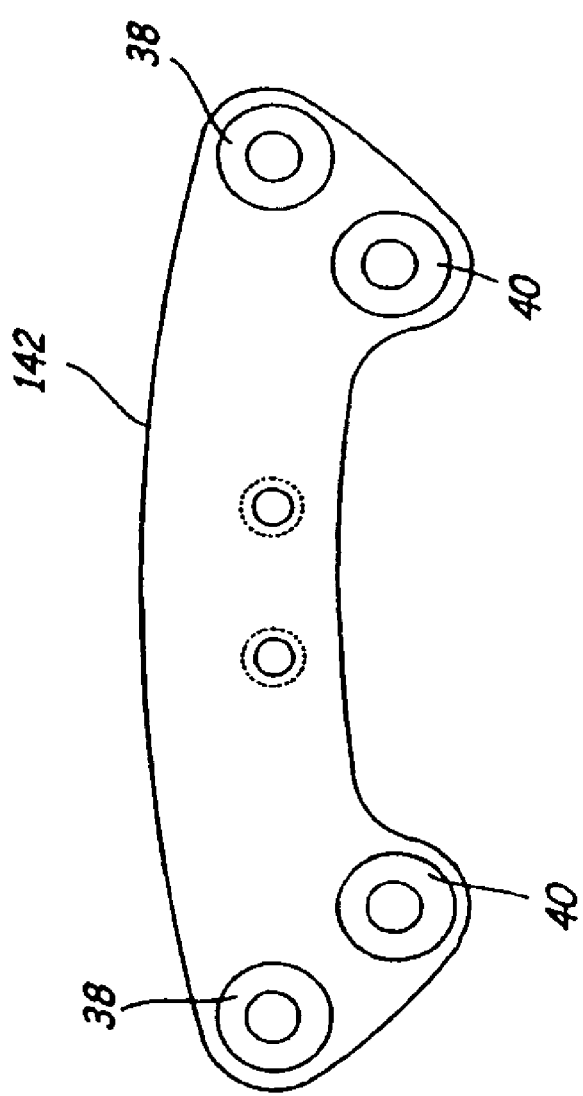

Support assembly 106 includes yoke 160, dowels 162, 164, and 166, and wheels 168, 170 and 172. Each of the dowels 162, 164, 166 includes a pair of wheels 168, 170, 172, respectively, for riding on beveled edges of arch 140. Wheels 168 are mounted on opposite ends of dowel 162 to ride on beveled edges 148. Wheels 170 are mounted on dowel 164 to ride on beveled edges 152. Wheels 172 are mounted on dowel 166 and ride on beveled edges 148. Thus arch 140 is captured between the three sets of rollers 168, 170, and 172 while permitting a sliding movement FIGS. 8A-8C and 9A-9B show the components of mount assembly 104 in greater detail. FIGS. 8A-8C show arc 140, while FIGS. 9A and 9B shown mounting plate 142. Mounting plate 144 is identical to mounting plate 142, and is merely inverted as shown in FIGS. 7A-7F.

Figure 11B:
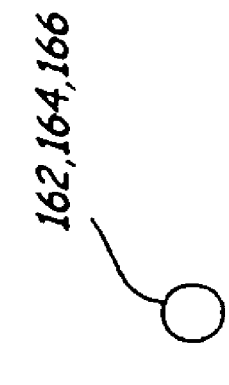
FIGS. 11A and 11B are top and end views of a dowel of the system of FIGS. 7A-7F.
Figure 11A:
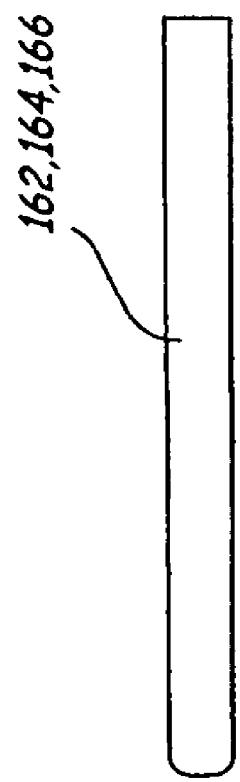

FIGS. 11A-11C shown yoke 160, which has base sections 180 and 182, and side walls 184 and 186. Mounting holes 188 in base section 180 allow yoke 160 to be mounted to a connecting element such as side knuckle 108, or to be mounted directly to wall plate 116. Side walls 184 and 186 include aligned slots 190 for dowel 162, aligned through holes 192 for dowel 164, and aligned through holes 194 for dowel 166.

FIGS. 11A and 11B show dowel 162, which is a ⅛ inch stainless steel dowel having one chamfered end. Dowels 164 and 166 are identical.

Figure 12B:
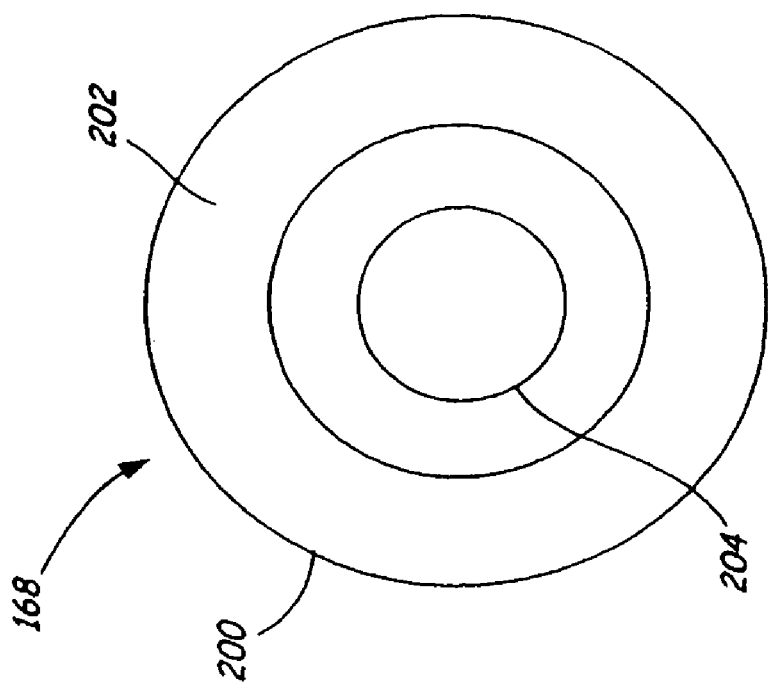
FIGS. 12A and 12B are top and end views of a wheel of the system of FIGS. 7A-7F.
Figure 12A:
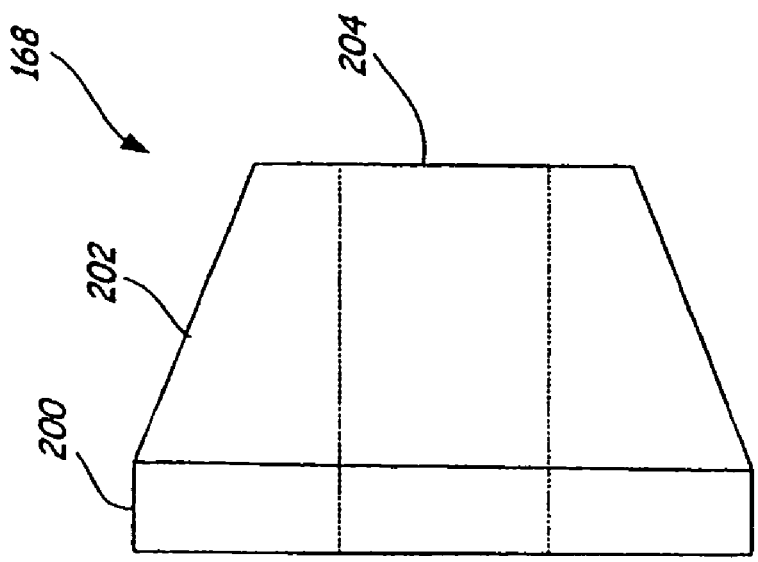

FIGS. 12A and 12B show one of the wheels 168 which are mounted on dowel 162. Wheel 168 includes cylindrical outer end 200, tapered section 202, and central bore 204. The inner diameter of bore 204 is sized to allow wheel 168 to fit over dowel 162. The angular taper of section 202 matches the angle of the beveled edges 152 of arc 140.

Both embodiments (10,100) of the present invention feature an arcuate sliding movement of a mount (14,104) with respect to a support (16,106). This defines a pivot axis about which the display (12,102) is tilted. The weight-balanced relationship of the display with respect to the pivot axis allows the display to be stable without clamping in any of the range of tilt angles. Thus a simple, easy-to-use tilt adjustment is provided.

FIGS. 13A and 13B show a third embodiment of the present invention. FIG. 13A is a side view of a mounting system 300, for use with larger displays 302. As illustrated in FIGS. 13A and 13B, the mounting system 300 again includes three major parts, mount bracket 310, support bracket 312, and a set of glides 314. Multiple mount brackets 310 can be used together to support larger sized displays 302 as shown in FIG. 13B. The mount bracket 310 is attached to a back surface of display 302. A front surface 304 of the mount bracket 310 acts as a mount plate to secure the mount bracket 310 to the display 302. Support bracket 312 is preferably mounted or secured to support plate 316, which in turn is secured to a wall or other support surface such as a post.

Figure 14:
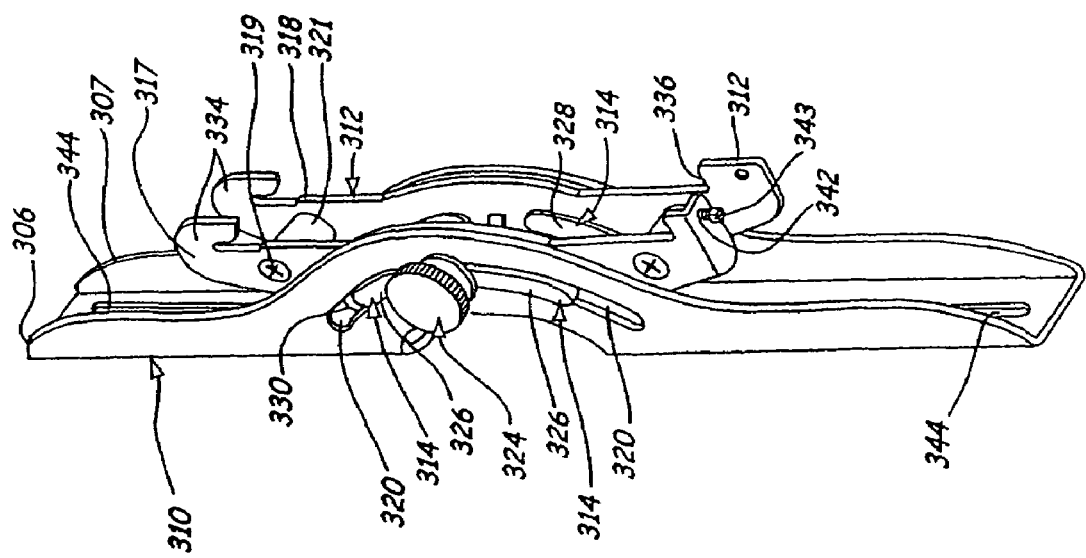
FIG. 14 is a perspective view of a mount and a support bracket of the third embodiment of the invention.

FIG. 14 is a perspective view of mount bracket 310 and support bracket 312. As illustrated in FIG. 14, mount bracket 310 has a pair of arcuate slots 320 in each of its first and second side walls 306 and 307 which define the range of sliding motion of mount bracket 310 with respect to support bracket 312. Support bracket 312 preferably includes a first and second sidewall 317 and 318, respectively, that are held together by fastener 319 that passes through spacer 321. The support bracket 312 is preferably positioned within the first and second sidewalls 306 and 307 of the mount bracket 310, such that the first and second sidewalls 317 and 306 and 318 and 307 are positioned next to each other. Each support bracket 312 carries the glides 314 and, preferably includes two glides 314 on each of the first and second sidewalls 317 and 318. The glides 314 project into arc slots 320 to allow a sliding movement of mount bracket 310 with respect to support bracket 312. The path of the sliding movement is again defined by the arc of slots 320.

As in the other embodiments, the arc defined by the slots 320 is a portion of a circle having its center defining a horizontal pivot axis 322. This virtal pivot axis will pass through a center of gravity of display 302. As a result, the weight of display 302 remains balanced about pivot axis 322, regardless of the tilt angle. Maintaining the display 302 in a balanced state allows easy adjustment by a user with minimal force. Once positioned, the display 302 will remain in that position. FIG. 13A illustrates in phantom the range of tilt angles for the display 302 about pivot axis 322.

Given the minimal force required to adjust the display 302, locking mechanism 324 can be incorporated as part of mounting system 300. Locking mechanism 324 secures display 302 in place once display 302 has been positioned. Locking mechanism 324 secures display 302 by securing mount bracket 310 in place with respect to support bracket 312. While locking mechanism 324 is not required to maintain display 302 in place, locking mechanism 324 helps avoid the display 302 from being re-positioned due to inadvertent contact. The user does not have to support or hold display 302 in place while tightening the locking mechanism 324. When multiple mount brackets 310 are used together, the locking mechanism 324 is preferably positioned to face outward rather than toward the middle of the display 302 for easy access by the user to tighten the locking mechanism 324. A similar type of locking mechanism could also be incorporated with the earlier described mounting systems 10, 100.

FIG. 15 shows a broken, exploded view of the mounting system 300 on a side that includes the locking mechanism 324. FIG. 15 illustrates the interaction of the mount 310, support bracket 312 and glide 314. In this embodiment, the glides 314 are separate pieces with preferably two glides 314 on each of the first and second sidewalls 317 and 318. As with the other glide 18, glides 314 include an outer projection 326, inner projection 328 and central flange 330. Outer projection 326 projects outward through arcuate slot 320. Inner projections 328 are similar in shape to outer projection 326, and extend through slots 332 placed in the first and second sidewalls 317 and 318 of support bracket 312. The size of arcuate slots 332 generally matches the shape of inner projections 328. Central flanges 330 are captured between opposing sidewalls 306 and 317 of mount bracket 310 and support bracket 312, respectively. Thus glides 314 are generally held in place with respect to support bracket 312 and mount bracket 310 slides back and forth along the path defined by arc slots 320.

The use of multiple glides 314 on each side of support bracket 312 could similarly be incorporated into the embodiments described by FIGS. 1A-1F. Alternatively, the two glides 314 could be replaced by ball bearings, or any number of similar objects that can ride within the arc slots 320 defined by the mount bracket 312.

Support bracket 312 includes a hook 334 at its top and a flange 336 at its bottom. The hook 334 is placed on a rail 338 at the top of the support plate or base 316. Once the hook 334 is secured on the rail 338, flange 336 fits beneath rail 340 at the bottom of support plate 316. Flange 336 preferably includes a threaded through hole 342 that will accept a set screw 343 that can be secured against the bottom rail 340. Tightening the set screw will help avoid the support bracket 312, and thus the display 302, from being pulled out from the support plate 316 or sliding laterally along the rails 338 and 340. Support bracket 312 and support plate 316 allow the display 302 to be slid or repositioned laterally along the rails 338 and 340 once the hook(s) 334 are placed on the rail 338. The support plate 316 also includes a series of openings 372 that allow for mounting support plate 316 to a wall. A number of different methods may be employed for mounting the support plate 316 to the wall, including differently shaped and spaced openings.

Mount 310 includes slots 344 that provide flexibility in securing display 302 to mount bracket 310. Alternate mounting techniques or patterns could also be used to secure the display 302 to the mount bracket 310.

FIG. 15 further illustrates the locking mechanism 324. The main parts of the locking mechanism 324 include a square opening 350 through each of the parallel sidewalls 317 and 318 of support bracket 312, a bolt 352, and a knob 354, or other easy to grip device that includes a nut or threaded insert to receive and secure bolt 352. The square opening 350 is located between the pair of glides 314 found on each of the first and second sidewalls 317 and 318 of the support bracket 312. The bolt 352 fits into the square opening 350 such that the head 356 of the bolt 352 will not fit through the opening 350, but a square base 358 of the shank of the bolt 352 located next to the head will prevent the bolt from turning during the fastening process. The bolt 352 extends through the opening 350 of the support bracket 312, and through the arc slot 320 of the mount bracket 310. The knob 354 fits onto and receives the threaded portion 360 of the shank of the bolt 352. When loose, the locking mechanism 324 allows for easy adjustment of the display 302 which remains balanced about the pivot axis 322. When tightened, the locking mechanism 324 exerts a force on the mount bracket 310 and support bracket 312 compressing them together and creating enough friction that the display 302 will not be tilted or its position altered by accidental or incidental bumping or jarring.

Figure 16B:
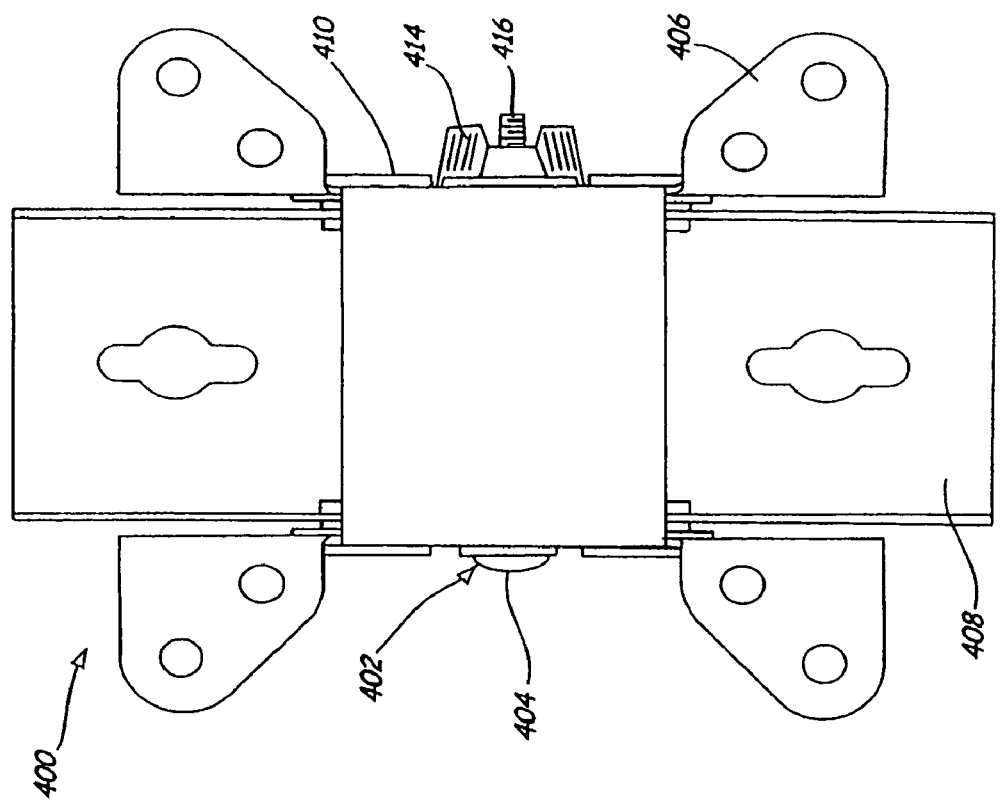
Figure 16C:
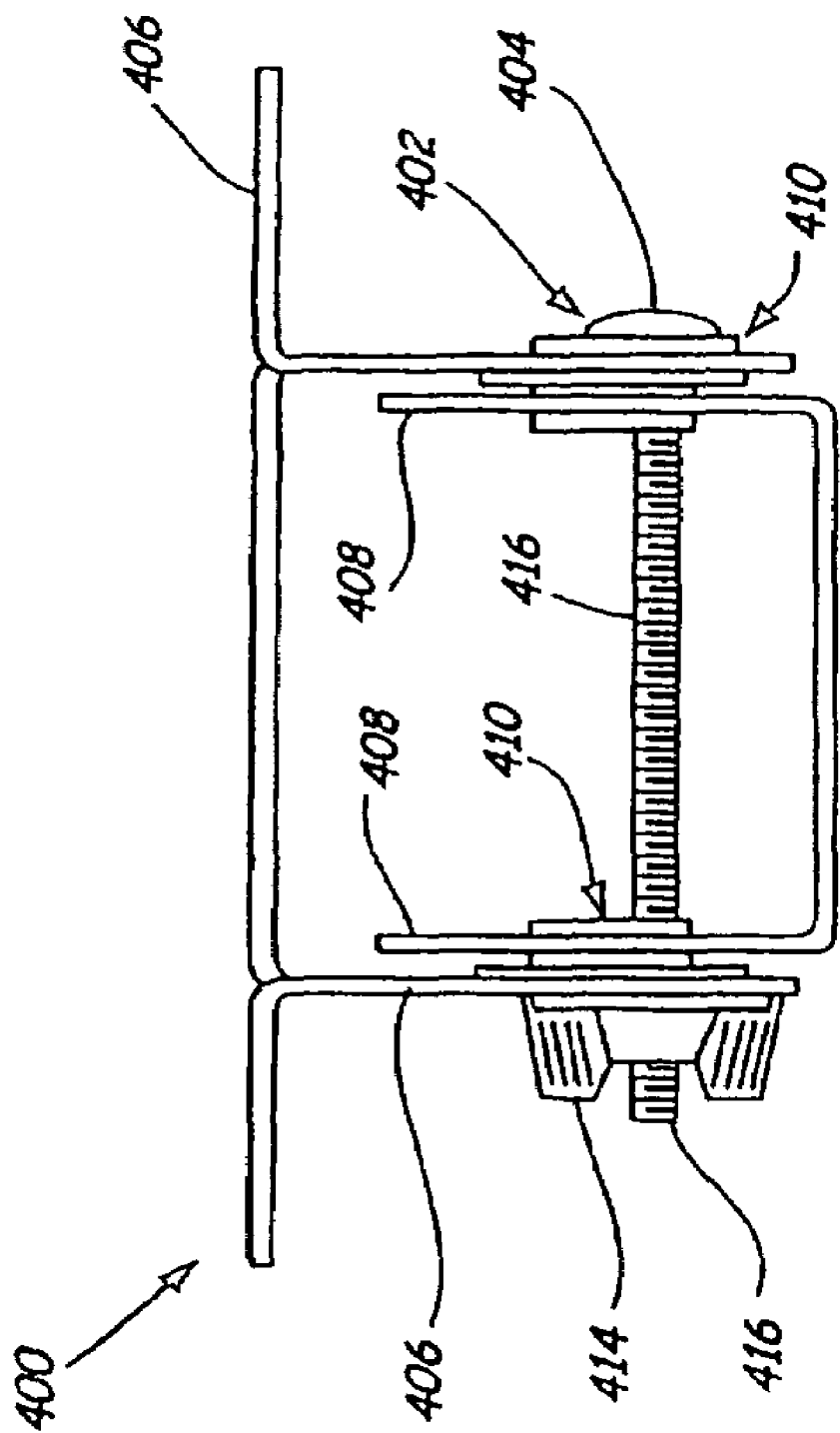

A similar locking mechanism as described above in the previous embodiment can also be incorporated into the earlier embodiments described in FIGS. 1-12. An alternative embodiment of a locking mechanism 402 is shown in FIGS. 16A-16C. In FIGS. 16A-16C, the locking mechanism 402 includes a bolt 404 that extends through a mounting systems 400, which includes mount bracket 406, support bracket 408 and glides 410. As in the earlier embodiments, glides 410 are carried by support bracket 408 and project into slots 412, which defines the path of sliding movement. Thus glides 412 are generally held in place with respect to support bracket 408 and mount bracket 406 slides back and forth along the path defined by arc slots 412. The bolt 404 preferably extends through the glides 412, mount bracket 406 and support bracket 408. A nut 414, preferably a wing not to simplify turning, is fastened onto threaded shaft 416 of bolt 404. By tightening wing nut 414 onto bolt 404, mount bracket 406, support bracket 408, and glides 410 are compressed together preventing movement of mount bracket 406 relative to support bracket 408. Again, locking mechanism 402 is not required to maintain mount bracket 406 in position relative to support bracket 408, but rather is incorporated to avoid movement due to accidental or inadvertent contact.

Although the Figures show a number of embodiments, others should be mentioned briefly. The mount assembly 14 as described in FIGS. 2A-2F has slots 20, and support 16 has glides 18, which slide back and forth in slots 20. In another embodiment, the mount assembly 14 has glides 18, and the support assembly 16 is equipped with slots 20 which the glides 18 rock back and forth in. In another embodiment, the glides 18 are replaced with separate pegs or dowels, spaced apart, which fit into the slots 20 and follow the path defined by the arced slots.

As described in FIGS. 7A-7F, the arch 140 is located on the mount assembly 104. In another embodiment, the arch 140 is held in place by the support assembly 106. In this embodiment, the yoke 160, dowels 162, 164, and 166, and wheels 168, 170, and 172 are located instead on the mount assembly, so that as the mount is moved through the arc defined by the arch located on the support assembly, the display would be tilted about the pivot axis. In yet another embodiment, the location of the dowels is inverted, so that dowel 164 rides on beveled edges 152, and dowels 162, 166, ride on beveled edges 148.

What is claimed is:

1. An interface system comprising a flat panel electronic display device and a mounting system, the mounting system comprising:
at least one mount comprising a mounting surface for receiving the flat panel electronic display device;
a support comprising a base and a support bracket, wherein the base presents an upper horizontal rail for carrying the support bracket and a lower horizontal rail, the support bracket including a portion extending under the lower horizontal rail with a latching element operably coupled thereto, the latching element selectively shiftable between a first position wherein a portion of the latching element is disposed behind the lower horizontal rail to inhibit removal of the support bracket from the base, and a second position wherein the latching element is clear of the lower horizontal rail so as to enable removal of the support bracket from the base;
the support and the mount together defining an arcuate sliding connection comprising a guide carried by either the mount or the support, the guide positioned along an arc defining a pivot axis forward of the mounting surface, and a traveler carried by the other of either the mount or the support, the traveler engaged and slidable in the guide, wherein the arcuate sliding connection enables sliding movement of the mount with respect to the support about the pivot axis such that the flat panel electronic display device is tilted about the pivot axis as the mount moves with respect to the support.

2. The interface system of claim 1, wherein the support bracket includes a hook and the hook attaches to the upper horizontal rail.

3. The interface system of claim 1, wherein the latching element is a set screw.

4. The interface system of claim 1, wherein the base further comprises an access aperture for cabling.

5. The interface system of claim 1, wherein the mounting surface has at least one elongated slot for attaching the interface.

6. The interface system of claim 5, further comprising a series of apertures linearly aligned with the at least one elongated slot.

7. The interface system of claim 1 further comprising a locking mechanism for securing a tilt angle of the mount with respect to the support.

8. An interface system comprising a flat panel electronic display device and a mounting system, the mounting system comprising:
a mount having a mounting surface confronting a rear surface of the flat panel electronic display device;
a support having a base and a support bracket, wherein the mount is carried by a hook and the hook attaches to the base, the base having a lower edge presenting a bottom rail, the support bracket including structure for selectively engaging the bottom rail and securing the interface with respect to the base;
the mount and the support together defining an arcuate sliding connection comprising:
a guide carried by either the mount or the support, the guide positioned along an arc defining a pivot axis; and
a moveable traveler carried by the other of either the mount or the support and engaged and slidable in the guide, wherein the arcuate sliding connection enables sliding movement of the mount with respect to the support about the pivot axis, wherein the pivot axis has a center which is substantially coincident with a center of gravity of the flat panel electronic display device and about which the interface is tilted as the mount moves with respect to the support.

9. The interface system of claim 8, wherein the base further comprises an access aperture for cabling.

10. The interface system of claim 8, wherein the mounting surface has at least one elongated slot for attaching the flat panel electronic display device.

11. The interface system of claim 8 further comprising a locking mechanism for securing a tilt angle of the mount with respect to the support.

12. The interface system of claim 8, wherein the structure for selectively engaging the bottom rail includes a set screw.

13. A mounting system for a flat panel electronic display device, the system comprising a base and a support bracket assembly, the base defining an upper rail and a lower rail, the support bracket assembly operably coupled with the base and presenting a mounting surface for receiving the flat panel electronic display thereon, the support bracket assembly including a first portion carrying a guide structure and a second portion carrying a traveler engaged and slidable in the guide structure so as to define a pivot axis forward of the mounting surface, wherein when the flat panel electronic display device is received on the mounting surface, the flat panel electronic display is selectively tiltable about the pivot axis, the support bracket assembly including a latching element selectively shiftable between a first position wherein the latching element is engaged with the lower rail of the base to inhibit removal of the support bracket assembly from the base, and a second position wherein the latching element is clear of the lower rail of the base so as to enable removal of the support bracket assembly from the base.

14. The mounting system of claim 13, wherein the latching element includes a set screw.

15. The mounting system of claim 13, wherein the base further comprises an access aperture for cabling.

16. The mounting system of claim 13, wherein the mounting surface has at least one elongated slot for attaching the flat panel electronic display device.

17. The mounting system interface system of claim 13, further comprising a locking mechanism for securing a tilt angle of the mount with respect to the support.

18. The mounting system of claim 13, wherein the mounting bracket assembly includes a plurality of guide structures and a plurality of travelers.

19. The interface system of claim 18, wherein each of the plurality of travelers is engaged and slidable in a separate one of the plurality of guide structures.

* * * * *